United States Patent
Cai et al.

(10) Patent No.: US 12,073,149 B2
(45) Date of Patent: Aug. 27, 2024

(54) COMPUTING INTERACTIONS OF SOURCES EMBEDDED IN THREE DIMENSIONAL LAYERED MEDIA

(71) Applicant: Southern Methodist University, Dallas, TX (US)

(72) Inventors: Wei Cai, Dallas, TX (US); Bo Wang, Dallas, TX (US); Wenzhong Zhang, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 553 days.

(21) Appl. No.: 17/341,596

(22) Filed: Jun. 8, 2021

(65) Prior Publication Data
US 2021/0406414 A1     Dec. 30, 2021

Related U.S. Application Data

(60) Provisional application No. 63/037,325, filed on Jun. 10, 2020.

(51) Int. Cl.
*G06F 30/10*     (2020.01)
*G06F 17/16*     (2006.01)

(52) U.S. Cl.
CPC .............. *G06F 30/10* (2020.01); *G06F 17/16* (2013.01)

(58) Field of Classification Search
CPC ................................ G06F 17/16; G06F 30/10
See application file for complete search history.

(56) References Cited

U.S. PATENT DOCUMENTS

| | | | | |
|---|---|---|---|---|
| 10,124,684 B2* | 11/2018 | Merkel | ................. | B60L 53/126 |
| 10,847,666 B2* | 11/2020 | Bourke, Jr. | ........... | H01L 31/055 |
| 2016/0336803 A1* | 11/2016 | Kurs | .................... | H04B 5/0075 |

OTHER PUBLICATIONS

Greengard et al., "A New Version of the Fast Multipole Method for Screened Coulomb Interactions in Three Dimensions", 2002, Journal of Computational Physics Publication, pp. 642-658. (Year: 2002).*
Cho et al., "A parallel fast algorithm for computing the Helmholtz integral operator in 3-D layered media," Journal of Computational Physics, May 2012, 231:5910-5925.

(Continued)

*Primary Examiner* — Elias Desta
(74) *Attorney, Agent, or Firm* — Fish & Richardson P.C.

(57) ABSTRACT

Systems and methods for computing interactions of charge sources embedded in three dimensional (3D) layered media. At least one of the methods includes decomposing the Green's function representing the potential caused by a charge source into a free space component and a plurality of reaction components; generating, for each reaction component of the plurality of reaction components, a multipole expansion (ME) operator and a multipole to local (M2L) translation operator; performing, for each reaction component of the plurality of reaction components, a convergence analysis of an ME of that reaction component; defining, for each reaction component, polarization charge sources based on the convergence analysis and combining the polarization charges sources with the charge sources; and computing, using a fast multipole method (FMM), interactions of the charge sources based on the polarization charge sources, the ME operators, and the M2L translation operators.

18 Claims, 10 Drawing Sheets

(56) References Cited

OTHER PUBLICATIONS

Hu et al., "Fast inhomogeneous plane wave algorithm for electromagnetic solutions in layered medium structures: two-dimensional case," Radio Science, Jan. 2000, 35(1):31-43.
Tausch et al., "The fast multipole method for arbitrary Green's functions," Contemporary Mathematics, Aug. 2002, 329:8 pages.
Wang et al., "A kernel-independent treecode based on barycentric lagrange interpolation," arXiv, Feb. 2019, 18 pages.
Wang et al., "Fast multipole method for 3-D helmholtz equation in layered media," SIAM Journal on Scientific Computing, Dec. 2019, 41(6):A3954-A3981.
Wang et al., "Fast multipole method for 3-D Laplace equation in layered media," Computer Physics Communications, Aug. 2019, 259:19 pages.
Wang et al., "Taylor expansion based fast Multipole Methods for 3-D Helmholtz equations in Layered Media," arXiv e-prints, Feb. 2019, 35 pages.
Ying et al., "A kernel-independent adaptive fast multipole algorithm in two and three dimensions," Journal of Computational Physics, Jan. 2004, 196(2):591-626.

\* cited by examiner

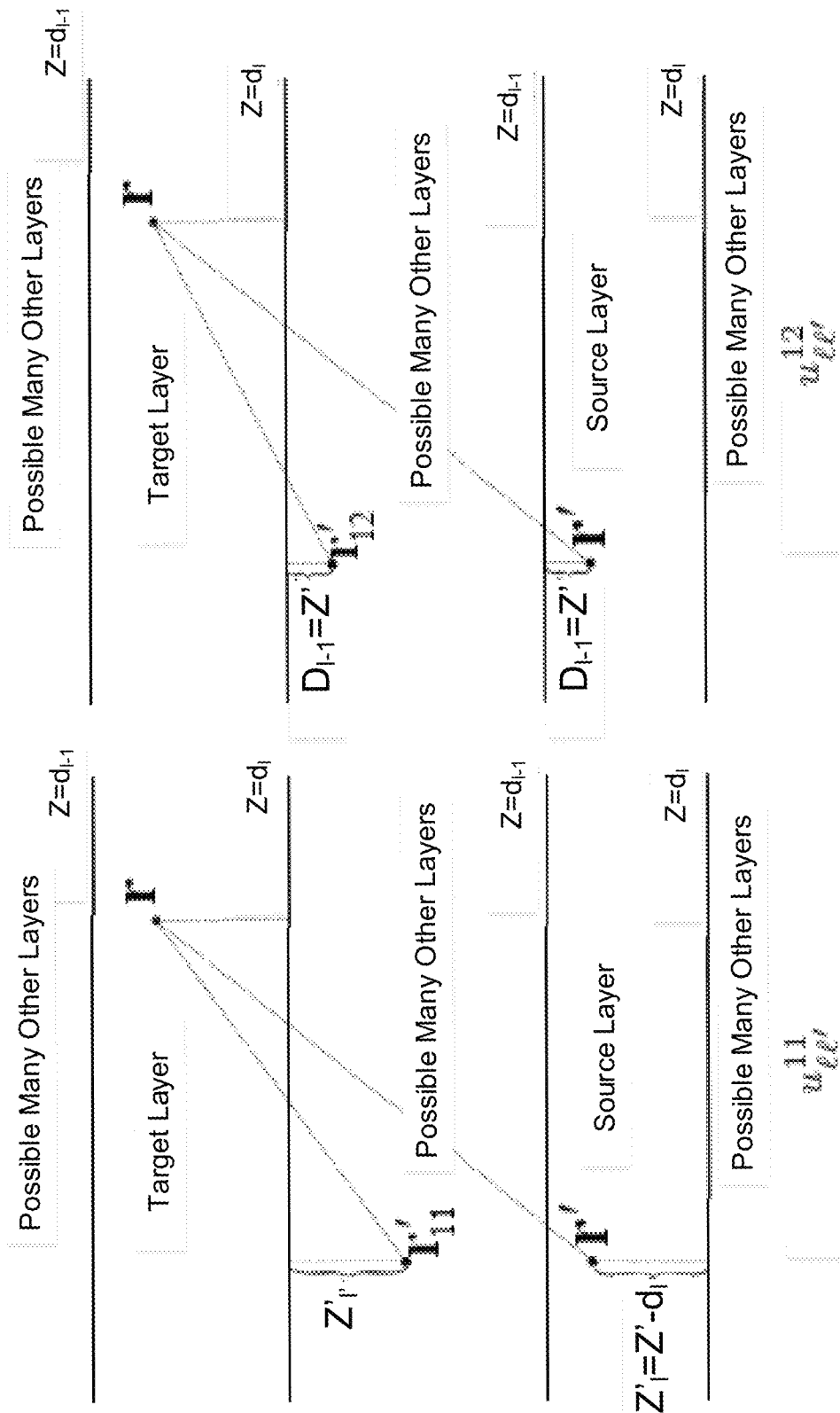

COMPUTING INTERACTIONS OF SOURCES EMBEDDED IN THREE DIMENSIONAL LAYERED MEDIA

CLAIM OF PRIORITY

This application claims priority under 35 USC § 119(e) to U.S. Provisional Patent Application Ser. No. 63/037,325, filed on Jun. 10, 2020, the entire contents of which are hereby incorporated by reference.

STATEMENT OF FEDERALLY SPONSORED RESEARCH

This invention was made with government support under DMS-1802143 awarded by National Foundation of Science (NSF) and contract W911NF-17-1-0368 awarded by the Department of the Army. The government has certain rights in the invention.

TECHNICAL FIELD

The present disclosure generally relates to three-dimensional layered media, including systems and methods of computing interactions of sources embedded in three dimensional (3D) layered media using a fast multipole method (FMM).

BACKGROUND

The fast multipole method (FMM) can refer to a numerical technique developed to speed up the computation of long-ranged forces in the n-body problem. Conventionally, the FMM speeds up such computations by expanding a system Green's function using a multipole expansion, which can facilitate the grouping of sources that lie close together and treating them as if they are a single source.

The FMM has also been applied in accelerating the iterative solver in the method of moments (MOM) as applied to computational electromagnetics problems. In some instances, the FMM can be based on the multipole expansion of the vector Helmholtz equation. By treating the interactions between far-away basis functions using the FMM, the corresponding matrix elements may not need to be explicitly stored, which can result in a significant reduction in required computational memory. If the FMM is then applied in a hierarchical manner, it can improve the complexity of matrix-vector products in an iterative solver from $O(N^2)$ to $O(N)$ in finite arithmetic (e.g., given a tolerance $\varepsilon$, the matrix-vector product can be guaranteed to be within the tolerance $\varepsilon$). Generally, the FMM algorithm can reduce the complexity of matrix-vector multiplication involving a certain type of dense matrix, which can arise out of many physical systems.

SUMMARY

Implementations of the present disclosure provide a novel fast multipole method (FMM) to compute long-range interactions (which can be governed by Green's function of the Laplace or Helmholtz equations) of charge or wave sources embedded in 3D layered media. In some implementations, the layered media Green's function is decomposed into a free space component and four types of reaction field components. New multipole expansions (MEs), local expansions (LEs), and multipole-to-local translation (M2L) operators for the reaction field components, which can allow the construction of the FMM algorithm, is specifically designed for the four types reaction components. In some implementations, to implement the ME in the FMM, equivalent polarization sources are defined for each reaction component based on the convergence analysis of its ME. In some implementations, the FMMs for the reaction components, implemented with the target particles and equivalent polarization sources, produces an O(N) complexity of the FMM for interactions of N charge sources or wave sources in 3D layered media.

In an aspect, a system for computing interactions of charge sources embedded in three dimensional (3D) layered media is provided. The system includes a computer-readable memory comprising computer-executable instructions. The system includes at least one processor configured to execute the computer-executable instructions. When the at least one processor is executing the computer-executable instructions, the at least one processor is configured to carry out one or more operations. The one or more operations include decomposing the Green's function representing the potential caused by a charge source into a free space component and a plurality of reaction components; generating, for each reaction component of the plurality of reaction components, a multipole expansion (ME) operator and a multipole to local (M2L) translation operator; performing, for each reaction component of the plurality of reaction components, a convergence analysis of an ME of that reaction component; defining, for each reaction component, polarization charge sources based on the convergence analysis and combining the polarization charges sources with the charge sources; and computing, using a fast multipole method (FMM), interactions of the charge sources based on the polarization charge sources, the ME operators, and the M2L translation operators.

Generating an ME operator and an M2L operator can include using a Sommerfeld-type integral representation of a Green's function. The function can include a Laplace Green's function. The convergence analysis can be based at least partially on a location of a charge source and a location of a polarization charge source. Connection between the polarization charge sources and the charge sources can be achieved in a convergence behavior of the ME. Determining interactions can include using a recurrence formula.

These and other aspects, features, and implementations can be expressed as methods, apparatus, systems, components, program products, non-transitory computer storage mediums, means or steps for performing a function, and in other ways, and will become apparent from the following descriptions, including the claims.

Implementations of the present disclosure can include one or more of the following advantages relative to conventional technology. The efficiency of computational algorithms using layered media Green's function (LMFG) can be improved. Computational speed and efficiency for understanding FMM processes, as it relates to 3D layered media, can be increased. Computational power requirements for computing interactions between sources in layered media can be decreased.

The details of one or more implementations of these systems and methods are set forth in the accompanying drawings and the description to be presented. Other features, objects, and advantages of these systems and methods will be apparent from the description and drawings, and from the claims.

DESCRIPTION OF DRAWINGS

FIGS. 4A-4D illustrate locations of equivalent polarization sources for the computation of reaction components.

Like reference symbols in the various drawings indicate like elements.

DETAILED DESCRIPTION

Figure 1:
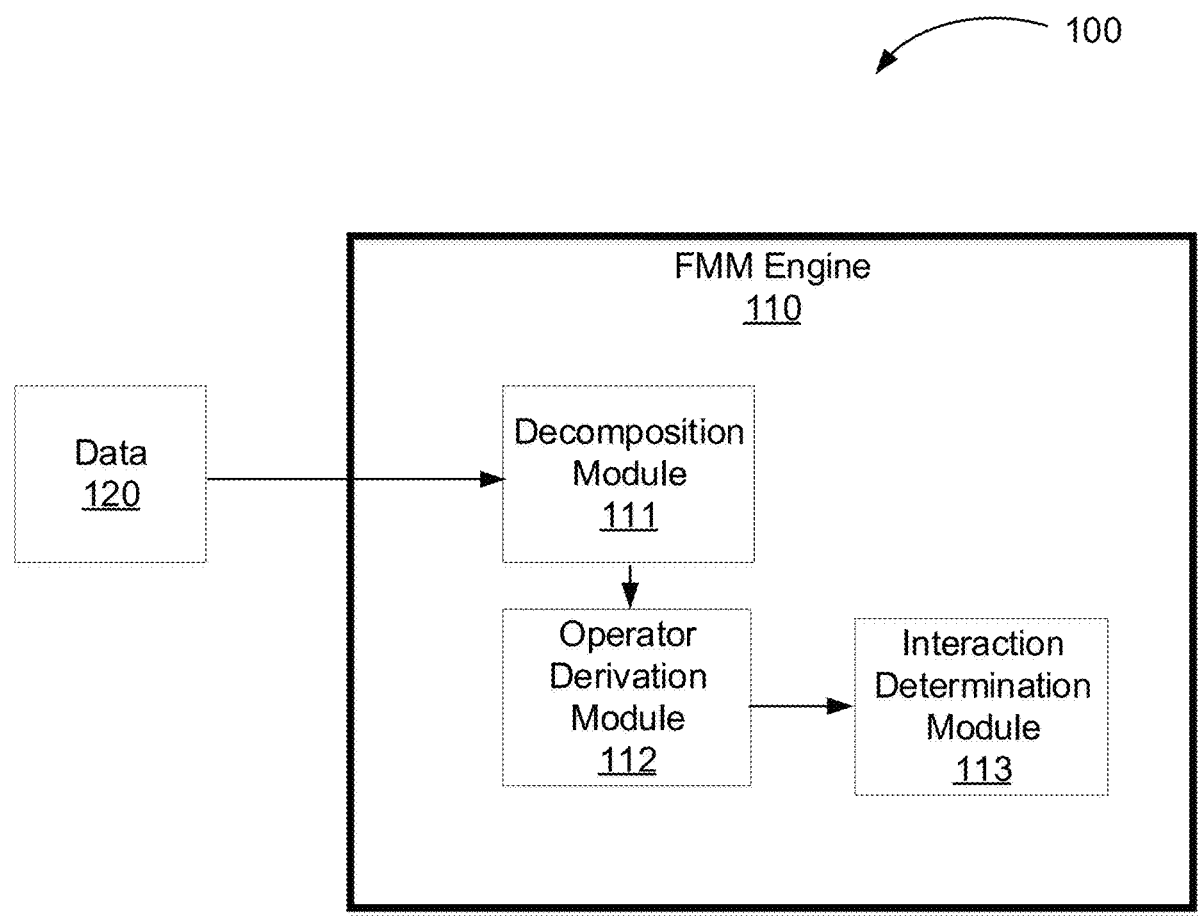
FIG. 1 is a block diagram illustrating an example system for computing interactions of sources embedded in 3D layered media.

The fast multipole method (FMM) can be used as a computational algorithm for treating multibody interactions The FMM can reduce the $O(N^2)$ cost of computing long-range interactions (Columbic electrostatics, wave scattering) among N particles (or sources) to O(N) or O(N logN). Such a capability can have a tremendous impact on modern computational biology, astronomy, and computational acoustics and electromagnetics, among many other applications in sciences and engineering. Conventional FMMs developed for particles in the free space can be based on multipole expansions (MEs) for a Green's function G(r, r')=G(r−r') to achieve a low-rank representation for the long range interactions between sources. The MEs for the wave interactions were facilitated by the Graf's addition theorem for Bessel functions.

As conventional FMMs were developed based on far field approximations by MEs obtained by the Graf's addition theorem applied to free space Green's functions, it may be difficult to extend this conventional approach to sources embedded in layered media, which can be ubiquitous in computer engineering, geophysical, and medical image applications. For those applications, Green's functions for layered media (layered Green's functions) are preferred to describe the interactions, as to avoid introducing artificial unknowns on the infinite material interfaces. Unfortunately, in those cases, theories such as Graf's addition theorem may not be available for layered Green's functions. For this reason, ME-based FMMs typically have not been extended to layered Green's functions due to the lack of corresponding multipole expansions of the far field of sources in general multi-layered media.

Implementations of the present disclosure can provide multipole and local expansions for far field of charges or wave sources in layered media as well as the development of the FMM method for N charge or wave source interactions within layered media at a cost of O(N). As a result, the applicability of the FMM can be extended from handling charge/source interactions in free homogeneous media to those in layered media, which may be encountered in many scientific and engineering applications.

In some implementations, the techniques described in this specification include developing the multipole expansion and local expansion (LE) for the Laplacian Green's function of layered media, allowing the extension of conventional FMM techniques from the interactions of charges in free space to interactions of charges embedded in layered media. In some implementations, the described techniques include using a Sommerfeld integral representation to derive the ME, LE and M2L operators for Laplace Green's function in free space. In some implementations, the equivalent polarization charges of source charge is used for each type of reaction component based on the convergence rate of the MEs for the reaction components, which can depend on the distance between the locations of the target charge and the polarization charge. The reaction components of the layered Green's function and the potential are associated with equivalent polarization charges. In some implementations, the described techniques include deriving the ME and LE and M2L operators for the reaction field components of the layered media Green's function based on the new expression using equivalent polarization charges. Accordingly, the distance between a target charge and the polarization of a source can be used to decide when the ME can be used to give a low rank representation of the far field at the target charge location. Combining the original source charges and the polarization charges for each reaction component, the FMM for charge interaction inside layered media can be implemented for the corresponding reaction potential component.

FIG. 1 is a block diagram illustrating an example system 100 for computing interactions of sources embedded in 3D layered media. The system 100 includes a FMM engine 110 configured to receive data 120

The data 120 specifies one or more characteristics of a layered media. For example, the data can specify a number of sources in the layered media, a number of layers of the layered media, the location of sources in the layered media, the size of the layered media, and types of sources, and so forth.

The FMM engine 110 can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In some implementations, the FMM engine 110 includes code-segment having executable instructions. In some implementations, the FMM engine 110 includes processing mechanisms such as, for example, a general purpose processor, a central processing unit (CPU, at least one application specific integrated circuit (ASIC), general purpose programmable microprocessors, graphic processing units, special-purpose programmable microprocessors, digital signal processors (DSPs), programmable logic arrays (PLAs), field programmable gate arrays (FPGA), special purpose electronic circuits, among others, or a combination of them.

The FMM engine 110 is configured to receive the data 120. The data 120 can be received through any of various techniques, such as wireless communications with a database, optical fiber communications, USB, CD-ROM, and manual input through a user interface.

The FMM engine includes a decomposition module 111, an operator derivation module 112, and an interaction determination module 113. The decomposition module 111 is configured to decompose a function representing the potential caused by the charge sources in the layered media into a free space component and a plurality of reaction components. For example, a Green's function can be decomposed into a free space component according to $$G(r, r') = \frac{1}{|r-r'|} = \frac{1}{r\sqrt{1-2\mu\cos\gamma+\mu^2}} = \frac{1}{r'\sqrt{1-2\frac{\cos\gamma}{\mu}+\frac{1}{\mu^2}}} \quad (2.9)$$

and a general reaction component according to $$u_{\ell\ell'}(r, r') = \begin{cases} u_{\ell\ell}^r(r, r') + \frac{1}{4\pi|r-r'|}, & \ell = \ell' \\ u_{\ell\ell'}^r(r, r'), & \text{otherwise,} \end{cases} \quad (3.3)$$

that can describe a plurality of reaction components (e.g., four reaction components).

The operator derivation module 112 is configured to: generate, for each reaction component of the plurality of reaction components, a multipole expansion (ME) operator and a multipole to local (M2L) translation operator; perform a convergence analysis of the ME for each of the plurality of reaction components; define, for each reaction component, polarization charge sources based on the convergence analysis; and combine the polarization charges sources with the charge sources.

For example, for the free space component, MEs, LEs, and M2L operators are derived by using Sommerfeld type integral representation of the Green's function. These techniques can also be used to derive MEs and LEs for the reaction components, as described later. First, consider several addition theorems which can be used for the derivation of ME, LE, and corresponding shifting and translation operators. The following definition can be adopted for spherical harmonics $$Y_n^m(\theta, \varphi) = (-1)^m \sqrt{\frac{2n+1}{4\pi}\frac{(n-m)!}{(n+m)!}} \hat{P}_n^m(\cos\theta)e^{im\varphi} := \hat{P}_n^m(\cos\theta)e^{im\varphi}, \quad (2.1)$$

where $(P_n^m(x))$ is the associated Legendre function of degree n and order m. Also, $$P_n^m(x) = (-1)^m(1-x^2)^{\frac{m}{2}}\frac{d^m}{dx^m}P_n(x) \quad (2.2)$$

for integer order (0<m<n) and $$P_n^{-m} = (-1)^m \frac{(n-m)!}{(n+m)!} P_n^m(x), \text{ so } \hat{P}_n^{-m}(x) = (-1)^m \hat{P}_n^m(x) \quad (2.3)$$

for (0<m<n) where $P_n(x)$ is the Legendre polynomial of degree n. The spherical harmonics can constitute a complete orthogonal basis of $L(S^2)$, where $S^2$ is the unit spherical surface, and $\langle Y_n^m, Y_{n'}^{m'}\rangle = \delta_{nn'}\delta_{mm'}$, $Y_n^{-m}(\theta, \varphi) = (-1)^m \overline{Y_n^m(\theta,\varphi)}$. Using the spherical harmonics defined in (2.1), addition theorems can be represented. For this purpose, constants can be defined as $$c_n = \sqrt{\frac{2n+1}{4\pi}}, A_n^m = \frac{(-1)^n c_n}{\sqrt{(n-m)!(n+m)!}}, |m| \le n. \quad (2.5)$$

The following theorems can be represented. In Theorem 2.1, P and Q can be points with spherical coordinates (r, θ, φ) and (ρ, α, β), respectively, and γ can be the angle subtended between them. Then, $$P_n(\cos\gamma) = \frac{4\pi}{2n+1}\sum_{m=-n}^{n} \overline{Y_n^m(\alpha, \beta)} Y_n^m(\theta, \varphi). \quad (2.6)$$

In Theorem 2.2, Q=(ρ, α, β) can be the center of expansion of an arbitrary spherical harmonic of negative degree. Point P can be defined as (r, θ, φ), with r>ρ, and P−Q=(r', θ', φ'). Then, $$\frac{Y_n^{m'}(\theta', \varphi')}{r'^{n'+1}} = \sum_{n=0}^{\infty}\sum_{m=-n}^{n} \frac{(-1)^{|m+m'|-|m'|}A_n^m A_{n'}^{m'} \rho^n Y_n^{-m}(\alpha, \beta)}{c_n^2 A_{n+n'}^{m+m'}} \frac{Y_{n+n'}^{m+m'}(\theta, \varphi)}{r^{n+n'+1}}.$$

In theorem 2.3, Q=(ρ, α, ρ) can be defined as the center of expansion of an arbitrary spherical harmonic of negative degree. Point P can be defined as (r, θ, Φ), with r<ρ, and P−Q=(r', θ', φ'). Then $$\frac{Y_n^{m'}(\theta', \varphi')}{r'^{n'+1}} = \quad (2.6b)$$

$$\sum_{n=0}^{\infty}\sum_{m=-n}^{n} \frac{(-1)^{|m+m'|-|m'|}A_n^m A_{n'}^{m'} \rho^n \cdot Y_{n+n'}^{m'-m}(\alpha, \beta)}{c_n^2 A_{n+n'}^{m'-m}\rho^{n+n'+1}} r^n Y_n^m(\theta, \varphi).$$

Denoted by (r, θ, φ) and (r', θ', φ'). for the spherical coordinates of given points (r, r'∈R³), the law of cosines gives $$|r-r'|^2 = r^2 + (r')^2 - 2rr'\cos\gamma \quad (2.7),$$

where $$\cos\gamma = \cos\theta\cos\theta' + \sin\theta\sin\theta'\cos(\varphi-\varphi') \quad (2.8).$$

The Green's function of the Laplace equation in free space is then given by $$G(r, r') = \frac{1}{|r-r'|} = \frac{1}{r\sqrt{1-2\mu\cos\gamma+\mu^2}} = \frac{1}{r'\sqrt{-2\frac{\cos\gamma}{\mu}+\frac{1}{\mu^2}} 1} \quad (2.9)$$

Furthermore, the following Taylor expansions can be defined as $$\frac{1}{r\sqrt{1-2\mu\cos\gamma+\mu^2}} = \sum_{n=0}^{\infty} P_n(\cos\gamma)\frac{\mu^n}{r} = \sum_{n=0}^{\infty} P_n(\cos\gamma)\frac{r'^n}{r^{n+1}}, \quad (2.10)$$

$$\mu = \frac{r'}{r} < 1$$

and $$\frac{1}{r'\sqrt{1-2\frac{\cos\gamma}{\mu}+\frac{1}{\mu^2}}} = \sum_{n=0}^{\infty} P_n(\cos\gamma)\frac{1}{r'\mu^n} = P_n(\cos\gamma)\frac{r^n}{r'^{n+1}}, \quad (2.11)$$

$$\mu = \frac{r'}{r} > 1.$$

These can result in the following error estimates $$\left|\frac{1}{|r-r'|} - \sum_{n=o}^{p} \frac{P_n(\cos\gamma_j)(r')^n}{r^{n+1}}\right| \leq \frac{1}{r-r'}\left(\frac{r'}{r}\right), \quad r > r' \quad (2.12)$$

and $$\left|\frac{1}{|r-r'|} - \sum_{n=o}^{\infty} P_n(\cos\gamma_j)\frac{r^n}{(r')^{n+1}}\right| \leq \frac{1}{r'-r}\left(\frac{r}{r'}\right)^{p+1}, \quad r > r' \quad (2.13)$$

by using the fact that $P_n(x)|\leq 1$ for all $x \in [-1,1]$.

Based on this, ME, LE, and corresponding shifting and translation operators can be designed. For example, $r_c^s$ and $r_c^t$ can be source and target centers close to source r' and target r (i.e., $|r'-r_c^s|<|r-r_c^s|$) and $|r'-r_c^t|>|r-r_c^t|$). Following the derivation in (2.7)-(2.11), the following Taylor expansions can be defined:

$$\frac{1}{|r-r'|} = \frac{1}{|(r-r_c^s)-(r'-r_c^s)|} = \sum_{n=0}^{\infty} \frac{P_n(\cos\gamma_s)}{r_s}\left(\frac{r_s'}{r_s}\right)^n \quad (2.14)$$

and $$\frac{1}{|r-r'|} = \frac{1}{|(r-r_c^t)-(r'-r_c^t)|}\sum_{n=0}^{\infty} \frac{P_n(\cos\gamma_t)}{r_t}\left(\frac{r_t}{r_t'}\right)^n \quad (2.15)$$

where $(r_s, \theta_s, \phi_s)$ $(r_t, \theta_t, \phi_t)$ are the spherical coordinates of $(r-r_c^s)$, and $(r-r_c^t)$, $(r_s', \theta_s', \phi_s')$ $(r_t', \theta_t', \phi_t')$ are the spherical coordinates of $(r'-r_c^s-r_c^t)$, and $$\cos\gamma_s = \cos\theta_s\cos\theta_s' + \sin\theta_s\sin\theta_s'\cos(\varphi_s-\varphi_s'), \cos\gamma_t = \cos\theta_t\cos\theta_t' + \sin\theta_t\sin\varphi_t'\cos(\varphi_t-\varphi_t') \quad (2.16).$$

$(P_n(\cos\gamma_s), P_n(\cos\gamma_t))$ mix the source and target information (r and r') together. Applying Legendre addition theorem 2.1 to expansions (2.14) and (2.15) gives the multipole expansion $$\frac{1}{|r-r'|} = \sum_{n=0}^{\infty}\sum_{m=-n}^{n} M_{nm}\frac{Y_n^m(\theta_s, \varphi_s)}{r_s^{n+1}} \quad (2.17)$$

and local expansion $$\frac{1}{|r-r'|} = \sum_{n=0}^{\infty}\sum_{m=-n}^{n} L_{nm} r_t^n Y_n^m(\theta_t, \varphi_t), \quad (2.18)$$

where $$M_{nm} = c_n^{-2} r_s'^n \overline{Y_n^m(\theta_s', \varphi_s')}, \quad L_{nm} = c_n^{-2} r_t'^{-n-1} \overline{Y_n^m(\theta_t', \varphi_t')}. \quad (2.19)$$

It may also be important to provide shifting and translation operators between expansions. Applying addition Theorem 2.3 to expansion functions in ME (2.17) can provide translation from ME (2.17) to LE (2.18), which can be given by $$L_{nm} = \sum_{|\nu|=0}^{\infty}\sum_{\mu=-\nu}^{\nu} \frac{(-1)^{\nu+|m|} A_\nu^\mu A_n^m Y_{n+\nu}^{\mu-m}(\theta_{st}, \varphi_{st})}{c_\nu A_{n+\nu}^{\mu-m} r_{st}^{n+\nu+1}} M_{\nu\mu}, \quad (2.20)$$

where $(r_{st}, \theta_{st}, \phi_{st})$ is the spherical coordinate of $(r_c^s-r_c^t)$. Similarly, the following center shifting operators for ME and LE, $$\tilde{M}_{nm} = \sum_{\nu=o}^{n}\sum_{\mu=-\nu}^{\nu} \frac{(-1)^{|m|-|m-\mu|} A_\nu^\mu A_{n-\nu}^{m-\mu} r_{ss}^\nu Y_\nu^{-\mu}(\theta_{ss}, \varphi_{ss})}{c_\nu^2 A_n^m} M_{n-\nu,m-\mu} \quad (2.21)$$

and $$\tilde{L}_{nm} = \quad (2.22)$$

$$\sum_{\nu=n}^{\infty}\sum_{\mu=-\nu}^{\nu} \frac{(-1)^{\nu-n-|\mu-m|+|\mu|-|m|} c_\nu^2 A_{\nu-n}^{\mu-m} A_n^m r_{tt}^{\nu-n} Y_{\nu-n}^{\mu-m}(\theta_{tt}, \varphi_{tt})}{c_{\nu-n}^2 c_n^2 A_\nu^\mu} L_{\nu\mu}$$

can be derived using the addition theorem 2.2 and 2.4, as previously described. In such cases, $(r_{ss}, \theta_{ss}, \phi_{ss})$ and $(r_{tt}, \theta_{tt}, \phi_{tt})$ are the spherical coordinates of $(r_c^s-\tilde{r}_c^s$ and $r_c^t-\tilde{r}_c^t)$, and $$\tilde{M}_{nm} = c_n^{-2} \tilde{r}_s'^n \overline{Y_n^m(\tilde{\theta}_s', \varphi_s')}, \quad \tilde{L}_{nm} = c_n^{-2} \overline{Y_n^m(\tilde{\theta}_t', \varphi_t')} \quad (2.23)$$

are the ME and LE coefficients with respect to new centers $(\tilde{r}_c^t$ and $\tilde{r}_c^s)$ respectively.

One important feature in the expansions (2.17) and (2.18) can be that the source and target coordinates are separated, which can facilitate the compression in the FMM. Besides using the addition theorem, this target/source separation can be achieved in the Fourier spectral domain. Thus, derivations for (2.17) and (2.18) can be achieved using the integral representation of $1/|r-r'|$. As will be described later, this methodology can be further applied to derive MEs and LEs for the reaction components of Green's function in layered media.

For example, the Green's function (G(r, r')) can be associated with the following Sommerfeld identity $$\frac{1}{|r-r'|} = \frac{1}{2\pi}\int_0^\infty \int_0^{2\pi} e^{ik_\rho((x-x')\cos\alpha+(y-y')\sin\alpha)-k_\rho|z-z'|} d\alpha dk_\rho. \quad (2.24)$$

By this identity, source/target separation in the spectral domain can be described as follows $$\frac{1}{|r-r'|} = \frac{1}{2\pi}\int_0^\infty \int_0^{2\pi} e^{ik_\rho k_0\cdot(r-r_c^s)} e^{-ik_\rho k_0\cdot(r'-r_c^s)} d\alpha dk_\rho, \quad (2.25)$$

$$\frac{1}{|r-r'|} = \frac{1}{2\pi}\int_0^\infty \int_0^{2\pi} e^{ik_\rho k_0\cdot(r-r_c^t)} e^{-ik_\rho k_0\cdot(r'-r_c^t)} d\alpha dk_\rho$$

for $(z\geq z'$ where $k_0=(\cos\alpha, \sin\alpha, i))$. For illustrative purposes, we consider the case $z\geq z'$ as an example. The following propositions can be used to extend the Funk-Hecke formula.

For Proposition 2.1, given $(r=(x, z)\in\mathbb{R}^3, k>\alpha\in[0, 2\pi))$ and denoted by $(r, \theta, \phi)$, the spherical coordinates of $(r, k=(-k_z^2\cos\alpha, (k^2-k_z^2)\sin\alpha, k_z))$ is a vector of complex entries. Choosing branch (2.27 (see below)) for $(\sqrt{k^2-k_z^2})$ in $e^{ik\cdot r}$ and $$\hat{P}_n^m\left(\frac{k_z}{k}\right),$$

then $$e^{ik\cdot r} = \sum_{n=0}^{\infty}\sum_{m=-n}^{n} A_n^m(r) i^n \hat{P}_n^m\left(\frac{k_z}{k}\right) e^{-im\alpha} = \sum_{n=0}^{\infty}\sum_{m=-n}^{n} \overline{A_n^m(r)} i^n \hat{P}_n^m\left(\frac{k_z}{k}\right) e^{im\alpha} \quad (2.26)$$

holds for all ($k_z \in C$), where $A_n^m(r) = 4\pi j_n(kr) Y_n^m(\theta, \varphi)$. The extension enlarges the range of the Funk-Hecke formula from $k_z \in (-k, k)$) to the whole complex plane by choosing branch $$\sqrt{k^2 - k_z^2} = -i\sqrt{r_1 r_2}\, e^{\frac{\theta_1 + \theta_2}{2}} \quad (2.27)$$

for the square root function $\sqrt{k^2 - k_z^2}$. Here, $(r_i, \theta_i)$, $i=1, 2$ are the modules and principles values of the arguments of complex numbers $k_z + k$ and $k_z - k$, i.e., $k_z + k = r_1 e^{i\theta_1}$, $-\pi < \theta_1 \le \pi$, $k_z - k = r_2 e^{i\theta_2}$, $-\pi < \theta_2 \le \pi$. Set $k_z = ik_\rho$, then $$k_\rho(\cos\alpha, \sin\alpha, i) = \lim_{k\to 0^+}\left(\sqrt{k^2 - k_z^2}\cos\alpha, \sqrt{k^2 - k_z^2}\sin\alpha, k_z\right) \quad (2.28)$$

As a result, an expansion for the $e^{ik_\rho k_0 \cdot r}$ with any given $k_\rho \ge 0$ and $r \in R^3$ can be derived.

For proposition 2.2, given ($r=(x, y, z) \in R^3$, $\alpha \in [0, 2\pi)$) and denoted by $(r, \theta, \phi)$ the spherical coordinates of ($r$, $k_0 = (\cos\alpha, \sin\alpha, i)$) is a vector of complex entries. Then $$e^{ik_\rho k_0 \cdot r} = \sum_{n=0}^{\infty}\sum_{m=-n}^{n} C_n^m r^n Y_n^m(\theta, \varphi) k_\rho^n e^{-im\alpha} = \sum_{n=0}^{\infty}\sum_{m=-n}^{n} C_n^m r^n \overline{Y_n^m(\theta, \varphi)} k_\rho^n e^{im\alpha} \quad (2.29)$$

holds for all ($r>0$, $k_\rho>0$), where $$C_n^m = e^{2n-m}\sqrt{\frac{4\pi}{(2n+1)(n+m)!(n-m)!}}.$$

For ($k \in R_+$, let $k_z = \sqrt{k^2 - k_\rho^2}$) and ($k = (k_\rho \cos\alpha, k_\rho \sin\alpha, k_z)$), the branch (2.27) is used for the square root. For each n, by the extended Legendre addition theorem, the following is obtained $$(2n+1)i^n j_n(kr) P_n\left(\frac{k\cdot r}{kr}\right) = \sum_{m=-n}^{n} 4\pi j_n(kr) Y_n^m(\theta, \phi) i^n \hat{P}_n^m\left(\frac{k_z}{k}\right) e^{-im\alpha} \quad (2.30)$$

$$= \sum_{m=-n}^{n} 4\pi j_n(kr) \overline{Y_n^m(\theta, \phi)} i^n \hat{P}_n^m\left(\frac{k_z}{k}\right) e^{im\alpha}$$

Then the limit of the above identity as ($k \to 0+$) is considered. The asymptotic $$j_n(z) \sim \frac{z^n}{(2n+1)!!} \text{ as } z \to 0^+ \quad (2.31)$$

provides the limit $$\lim_{k\to 0^+} k^{-n} j_n(kr) = \frac{r^n}{(2n+1)!!}. \quad (2.32)$$

For the Legendre polynomial on the left-hand side of (2.30), since ($P_n$) is an n-th order polynomial with leading term coefficient $$2^{-n}\binom{2n}{n},$$

and the following is provided $$\frac{k\cdot r}{r} \to \frac{k_\rho k_0 \cdot r}{r}, \quad (2.33)$$

$$\lim_{k\to 0^+} k^n P_n\left(\frac{k\cdot r}{kr}\right) = 2^{-n}\binom{2N}{n}\left(\frac{k_\rho k_0 \cdot r}{r}\right)^n. \quad (2.34)$$

For the associated Legendre functions on the right-hand side of (2.30), the Rodrigues' formula provides that, for $0 \le m \le n$, $$\hat{P}_n^m(x) = \frac{c_{nm}}{2^n n!}(1-x^2)^{\frac{m}{2}}\frac{d^{n+m}}{dx^{n+m}}(x^2-1)^n, \quad c_{nm} = \sqrt{\frac{2n+1}{4\pi}\frac{(n-m)!}{(n+m)!}}, \quad (2.35)$$

for $x = k_z/k$, $\sqrt{1-x^2} = k_\rho/k$ is provided and $$k^n \hat{P}_n^m\left(\frac{k_z}{k}\right) = \frac{c_{nm}}{2^n n!}\frac{(2n)!}{(n-m)!}k_\rho^m \cdot k^{n3l:m}\tilde{Q}_{n-m}\left(\frac{k_z}{k}\right), \quad (2.36)$$

where ($Q_n(z)$) is a monic polynomial of degree n. Hence, the following is provided $$\lim_{k\to 0^+} k^n \hat{P}_n^m\left(\frac{k_z}{k}\right) = \frac{c_{nm}}{2^n n!}\frac{(2n)!}{(n-m)!}k_\rho^m \cdot (ik_\rho)^{n-m}. \quad (2.37)$$

The identity of $\overline{P_n^{-m}}(x) = (-1)^m \overline{P_n^m}(x)$ can give the limit for $-n \le m < 0$ cases. The limit of (2.30) can be the provided as follows $$\frac{(ik_\rho k\cdot r)^n}{n!} = \sum_{m=-n}^{n} c_n^m r^n Y_n^m(\theta, \phi) k_\rho^n e^{-im\alpha} = \sum_{m=-n}^{n} c_n^m r^n \overline{Y_n^m(\theta, \phi)} k_\rho^n e^{im\alpha}. \quad (2.38)$$

Applying the spherical harmonic expansion (2.29) to the exponential functions $e^{-ik_\rho k_0 \cdot (r-r_c^s)}$ and $e^{ik_\rho k_0 \cdot (r-r_c^t)}$ gives (2.39)

$$\frac{1}{|r-r'|} = \sum_{n=0}^{\infty} \sum_{m=-n}^{n} M_{nm} \frac{(-1)^n c_n^2 C_n^m}{2\pi} \int_0^\infty \int_0^{2\pi} k_\rho^m e^{ik_\rho k_0 \cdot (r-r_c^s)} e^{im\alpha} d\alpha dk_\rho$$

and $$\frac{1}{|r-r'|} = \sum_{n=0}^{\infty} \sum_{m=-n}^{n} \hat{L}_{nm} r_t^n Y_n^m(\theta_t, \varphi_t), \quad (2.40)$$

for $z \leq z'$, where $(M_{nm})$ is defined in (2.19) and $$\hat{L}_{nm} = \frac{C_n^m}{2\pi} \int_0^\infty \int_0^{2\pi} k_\rho^n e^{ik_\rho k_0 \cdot (r_c^t - r')} e^{-im\alpha} d\alpha dk_\rho. \quad (2.41)$$

The identity $$r^{-n-1} Y_n^{-m}(\theta, \varphi) = \frac{(-1)^m c_n^2 C_n^m}{2\pi} \int_0^\infty \int_0^{2\pi} k_\rho^n e^{ik_\rho k_0 \cdot r} e^{-im\alpha} d\alpha dk_\rho \quad (2.42)$$

provides that (2.39) and (2.40) are the ME (2.17) and LE (2.18) in the case of $z \geq z'$.

To derive the translation from multipole expansion (2.17) to local expansion (2.18), further splitting is performed according to $$e^{ik_\rho k \cdot (r-r_c)} = e^{ik_\rho h_0 \cdot (r-r_c^t)} e^{ik_\rho k_0 \cdot (r_c^t - r_c^s)} \quad (2.43)$$

in (2.39), and the expansion (2.29) is applied. The following translation is then obtained $$L_{nm} =$$

$$C_n^m \sum_{v=0}^{\infty} \sum_{\mu=-v}^{v} M_{v\mu} \frac{(-1)^v c_v^2 X C_v^\mu}{2\pi} \int_0^\infty \int_0^{2\pi} k_\rho^{n+v} e^{ik_\rho k_0 \cdot (r_c^t - r_c^s)} e^{i(\mu-m)\alpha} d\alpha dk_\rho ..$$

Figure 3:
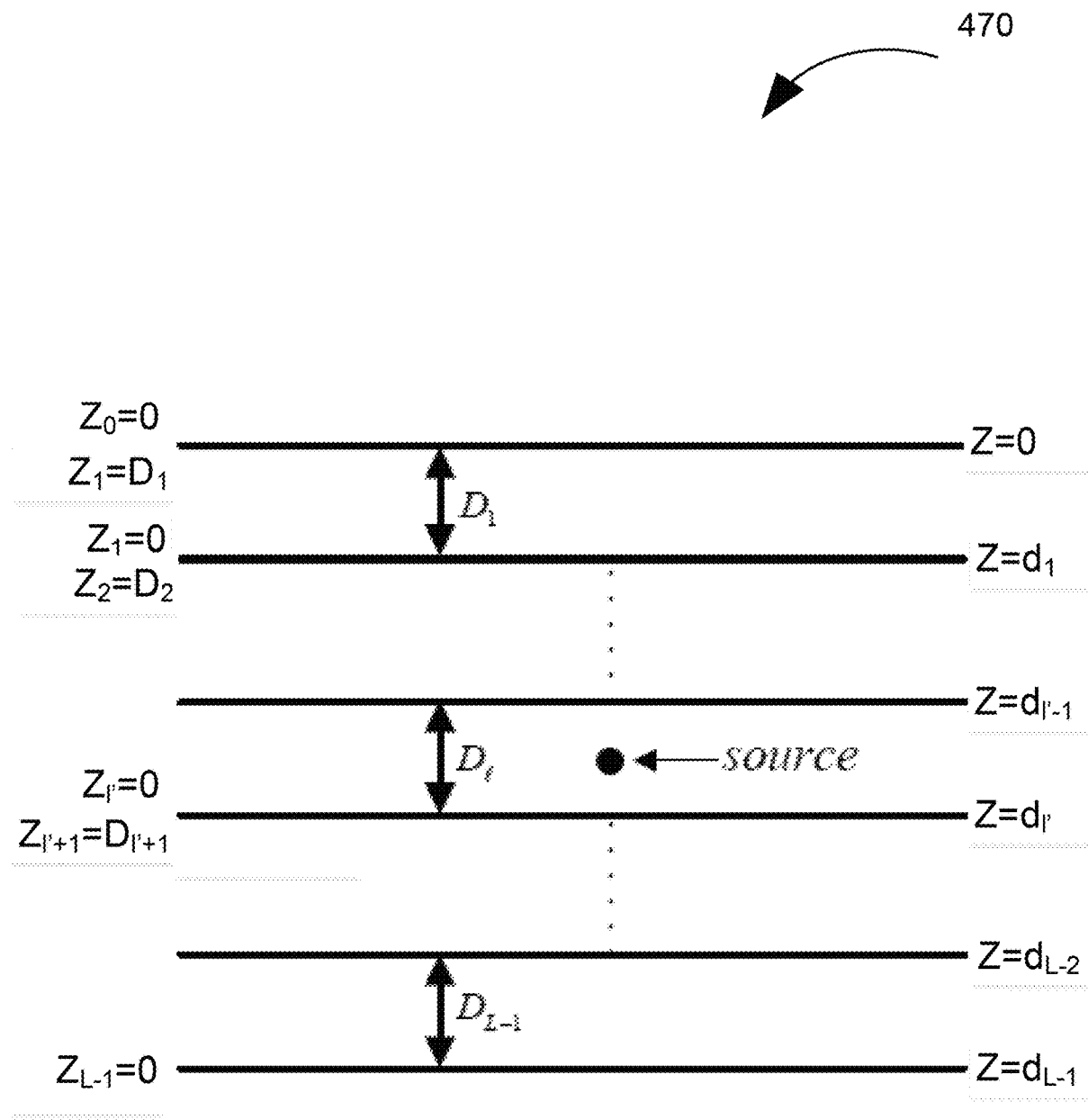
FIG. 3 is a diagram illustrating an example layer structure for general multi-layer media.
Figure 4C:
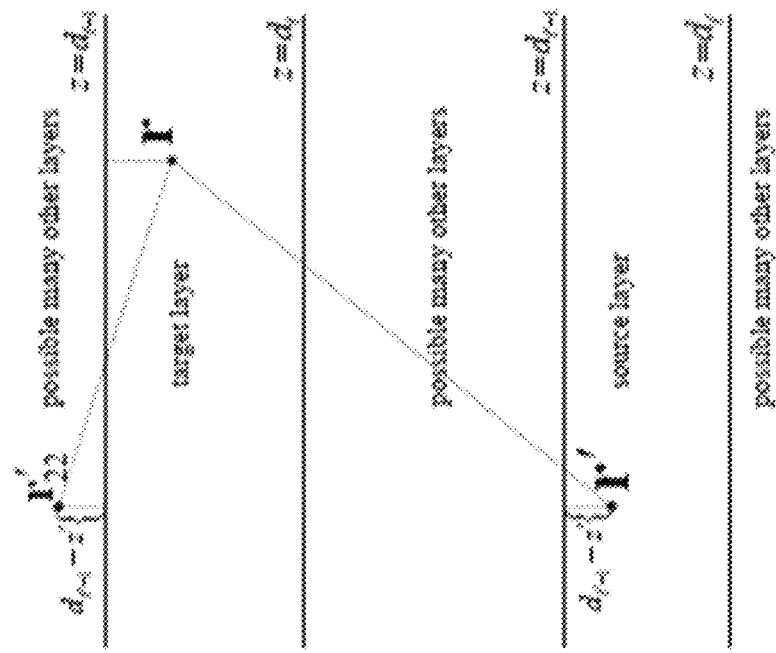
Figure 4D:
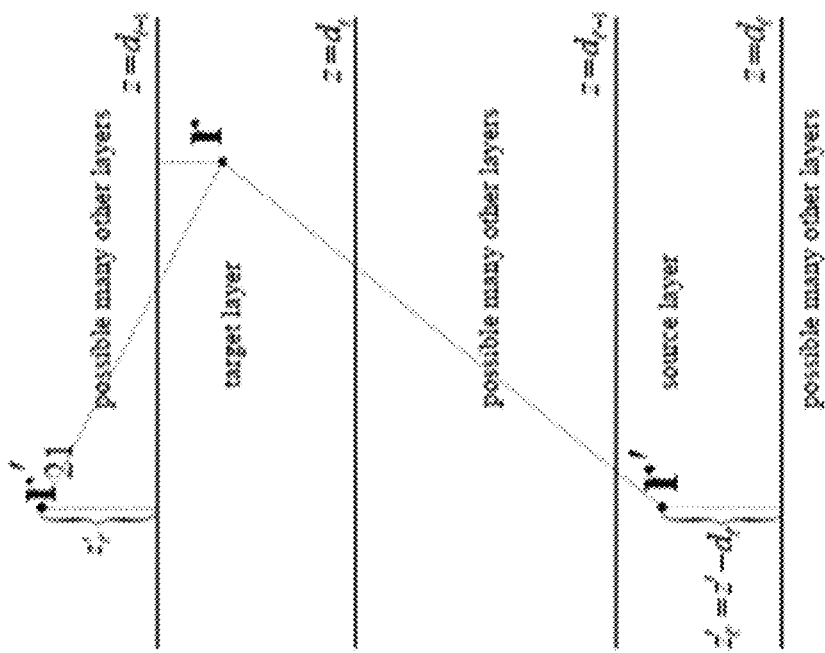

FIG. 3 illustrates the layer structures for general multi-layer media. For the reaction components, consider a layered medium consisting of L-interfaces located at $z=d_l$, $l=0, 1, \ldots, L\ 1$, as shown in FIG. 3. The piece-wise constant material parameter is given by $\{k_1\} 1 = 0^L$. Assume, for example, a point source at $r' = (x', y', z')$ in the l'th layer $(d_{l'} < z' < d_{l'-1})$. In such cases, the layered media Green's function for the Laplace equation satisfies $$\Delta u_{\ell \ell'}(r, r') = \delta(r, r') \quad (3.1)$$

at field point $r=(x, y, z)$ in the l'th layer $(d_l < z < d_{l-1})$ where $\delta(r, r')$ is the Dirac delta function. By using partial Fourier transform along x- and y-directions, the problem can be solved analytically for each layer in z by imposing transmission conditions at the interface between lth and (l−1)th layer $(z=d_{l-1})$, i.e., $$u_{\ell-1,\ell'}(x, y, z) = u_{\ell \ell'}(x, y, z), \quad (3.2)$$

$$k_{\ell-1} \frac{? u_{\ell-1,\ell \ell'}(x, y, z)}{?z} = k_\ell \frac{? \hat{u}_{\ell,\ell'}(k_x, k_y, k_z)}{?z},$$

as well as decay conditions in the top and bottom-most layers as $z \to \pm\infty$. Therefore, the layered Green's function can be expressed directly. The expression of Green's function in the physical domain has the form $$u_{\ell \ell'}(r, r') = \begin{cases} u_{\ell \ell'}^r(r, r') + \frac{1}{4\pi |r-r'|}, & \ell = \ell' \\ u_{\ell \ell'}^r(r, r'), & \text{otherwise}, \end{cases} \quad (3.3)$$

where $(u_{\ell \ell'}^r(r, r'))$ refers to the reaction component. In general, $(u_{\ell \ell'}^r(r,r'))$ has two components. However, only one component may be left in the top and bottom layer due to decay conditions as $z \to \infty$. Thus, the reaction component has decomposition $$u_{\ell \ell'}^r(r, r') = \begin{cases} u_{0 \ell'}^1(r, r') \\ u_{\ell \ell'}^1(r, r') + u_{\ell \ell'}^2(r, r'), & 0 < \ell < L \\ u_{L \ell'}^2(r, r') \end{cases} \quad (3.4)$$

with components by Sommerfeld-type integrals:

$$\begin{cases} u_{\ell \ell'}^1(r, r') = \frac{1}{8\pi^2} \int_0^\infty \int_0^{2\pi} e^{ik_\alpha \cdot (\rho-\rho')} e^{-k_\rho(z-d_\ell)} \psi_{\ell \ell'}^1(k_\rho, z') d\alpha dk_\rho, \ell < L \\ u_{\ell \ell'}^2(r, r') = \frac{1}{8\pi^2} \int_0^\infty \int_0^{2\pi} e^{ik_\alpha \cdot (\rho-\rho')} e^{-k_\rho(d_{\ell-1}-z)} \psi_{\ell \ell'}^2(k_\rho, z') d\alpha dk_\rho, \ell > 0 \end{cases} \quad (3.5)$$

where $k_\alpha = k_\rho(\cos \alpha, \sin \alpha)$, $\rho = (x, y)$, $\varsigma' = (x', y')$, $$\psi_{\ell' 0}^1(k_\rho, z') = \begin{cases} e^{-k_\rho z'} \sigma_{\ell' 0}^{11}(k_\rho), \\ e^{-k_\rho(z'-d_{\ell'})} \sigma_{\ell' \ell'}^{11}(k_\rho) + e^{-k_\rho(d_{\ell'-1}-z')} \sigma_{\ell' \ell'}^{12}(k_\rho), & 0 < \ell' < L, \\ e^{-k_\rho(d_{L-1}-z')} \sigma_{\ell' \ell'}^{12}(k_\rho). \end{cases} \quad (3.6)$$

$$\psi_{\ell \ell'}^2(k_\rho, z') = \begin{cases} e^{-k_\rho z'} \sigma_{\ell' 0}^{21}(k_\rho), \\ e^{-k_\rho(z'-d_{\ell'})} \sigma_{\ell' \ell'}^{21}(k_\rho) + e^{-k_\rho(d_{\ell'-1}-z')} \sigma_{\ell' \ell'}^{22}(k_\rho), & 0 < \ell' < L, \\ e^{-k_\rho(d_{L-1}-z')} \sigma_{\ell' \ell'}^{22}(k_\rho). \end{cases}$$

Referring back to FIG. 1, in some cases, reaction densities $\sigma_{ll'}^{11}(k_\rho)$, $\sigma_{ll'}^{12}(k\rho)$, $\sigma_{ll'}^{21}(k_\rho)$, $\sigma_{ll'}^{22}(k_\rho)$ are only determined by the layer structure and the material parameter $k_l$ in each of the layers. The aforementioned formulas are general formulas which can be applicable to multi-layered media. The following explicit formulas for reaction densities in the cases of three layers are provided as examples. Source in the top layer $$\sigma_{00}^{11}(k_\rho) = \frac{\sinh(dk_\rho)(k_0 k_2 - k_1^2) + k_1(k_0 - k_2)\cosh(dk_\rho)}{\kappa(k_\rho)}, \quad (3.7)$$

$$\sigma_{10}^{21}(k_\rho) = \frac{k_0(k_1 + k_2)e^{k\rho d}}{\kappa(k_\rho)}, \quad \sigma_{10}^{11}(k_\rho) = \frac{k_0(k_1 - k_2)}{\kappa(k_\rho)},$$

$$\sigma_{20}^{21}(k_\rho) = \frac{2k_0 k_1}{\kappa(k_\rho)},$$

source in the middle layer $$\sigma_{01}^{12}(k_\rho) = \frac{k_1(k_1 + k_2)e^{dk_\rho}}{\kappa(k_\rho)}, \quad \sigma_{10}^{11}(k_\rho) = \frac{k_1(k_1 - k_2)}{\kappa(k_\rho)}, \quad (3.8)$$

$$\sigma_{11}^{11}(k_\rho) = \frac{(k_1 - k_2)(k_1 + k_0)e^{dk_\rho}}{2\kappa(k_\rho)},$$

$$\sigma_{11}^{21}(k_\rho) = \frac{(k_1 - k_2)(k_1 - k_0)e^{-dk_\rho}}{2\kappa(k_\rho)},$$

$$\sigma_{11}^{12}(k_\rho) = \frac{(k_1 - k_2)(k_1 - k_0)}{2\kappa(k_\rho)},$$

$$\sigma_{11}^{22}(k_\rho) = \frac{(k_1 + k_2)(k_1 - k_0)e^{dk_\rho}}{2\kappa(k_\rho)},$$

$$\sigma_{21}^{22}(k_\rho) = \frac{k_1(k_1 - k_0)}{\kappa(k_\rho)}, \quad \sigma_{21}^{21}(k_\rho) = \frac{k_1(k_0 + k_1)e^{k\rho d}}{\kappa(k_\rho)}$$

and source in the bottom layer $$\sigma_{02}^{12}(k_\rho) = \frac{2k_1 k_2}{k(k_\rho)}, \quad \sigma_{12}^{22}(k_\rho) = \frac{k_2(k_1 - k_0)}{k(k_\rho)}, \quad (3.9)$$

$$\sigma_{12}^{12}(k_\rho) = \frac{k_2(k_0 + k_1)e^{dk_\rho}}{k(k_\rho)},$$

$$\sigma_{22}^{22}(k_\rho) = \frac{(k_1^2 - k_0 k_2)\sinh(dk_\rho) + k_1(k_2 - k_0)\cosh(dk_\rho)}{\kappa(k_\rho)},$$

where $\kappa(k_{92}) = \sin h(dk_\rho)(k_0 k_2 + k_1^2) + k_1(k_0 + k_2)\cos h(dk_\rho)$.

Next, to define the potential caused by sources embedded in multi-layer media, Let $(P_l = \{(Q_{lj}, r_{lj}), j=1, 2, \ldots, N_l\}, l=0, 1, \ldots, L)$ be L groups of source particles distributed in a multi-layered medium with L+1 layers (see FIG. 3). The group of particles in l-th layer can be denoted by Pl. The potential at $r_{li}$ due to all other particles can be given by the summation $$k(k_\rho) = \sinh(dk_\rho)(k_0 k_2 + k_1^2) + k_1(k_0 + k_2)\cosh(dk_\rho)\Phi_\ell(r_{\ell\ell}) \quad (3.10)$$

$$= \sum_{\ell'=0}^{L} \sum_{j=0}^{N_{\ell'}} Q_{\ell'j} u_{\ell\ell'}(r_{\ell i} r_{\ell' j})$$

-continued $$= \sum_{j=1, j \neq i}^{N_\ell} \frac{Q_{\ell i}}{4\pi|r_{\ell i} - r_{\ell j}|} + \sum_{\ell'=0}^{L} \sum_{j=1}^{N_{\ell'}} Q_{\ell' j} u_{\ell\ell'}^r(r_{\ell i}, r_{\ell' j}),$$

Where $u_{ll'}^r(r, r')$ are the reaction field components defined in (3.4)-(3.6). For expressions (3.5) and (3.6), $u_{ll'}^1(r,r')$ and $u_{11'}^2(r,r')$ have further decomposition $$u_{\ell\ell'}^a(r, r') = \begin{cases} u_{\ell 0}^{a1}(r, r'), \\ u_{\ell\ell'}^{a1}(r, r') + u_{\ell\ell'}^{a2}(r, r'), 0 < \ell < K, a = 1, 2, \\ u_{\ell L}^{a2}(r, r') \end{cases} \quad (3.11)$$

while each component has Sommerfeld type representation $$u_{\ell\ell'}^{ab}(r, r') = \frac{1}{8\pi^2} \int_0^\infty \int_0^{2\pi} e^{ik_\alpha \cdot (\rho - \rho')} Z_{\ell\ell'}^{ab}(z, z') \sigma_{\ell\ell'}^{ab}(k_\rho) d\alpha dk_\rho, \quad (3.12)$$

$$a, b = 1, 2.$$

Here, $\{Z_{11}^{ab}(z, z')\}_{a,b=1,2}$ are exponential functions defined as $$Z_{\ell\ell'}^{11}(z, z') := e^{-k_\rho(z - d_\ell + z' - d_{\ell'})}, \quad Z_{\ell\ell'}^{12}(z, z') := e^{-k_\rho(z - d_\ell + d_{\ell'-1} - z')}, \quad Z_{\ell\ell'}^{21}(z, z') := e^{-k_\rho(d_{\ell-1} - z + z' - d_{\ell'})}, \quad Z_{\ell\ell'}^{22}(z, z') := e^{-k_\rho(d_{\ell-1} - z + d_{\ell'-1} - z')} \quad (3.13).$$

Since the reaction components of Green's function in multi-layer media have different expressions (3.5) and (3.11) for source and target particles in different layers, it can be important to perform calculations individually for interactions between any two groups of particles among the L+1 groups $\{P_l\}_{l=0}^L$. Applying expressions (3.4), (3.5) and (3.11) in (3.10), the following expression can be obtained $$\Phi_\ell(r_{\ell i}) = \Phi_L^{free}(r_{\ell i}) + \Phi_\ell^r(r_{\ell i}) \quad (3.14)$$

$$= \Phi_\ell^{free}(r_{\ell i}) + \sum_{\ell'=0}^{L-1} [\Phi_{\ell\ell'}^{11}(r_{\ell i}) + \Phi_{\ell\ell'}^{21}(r_{\ell i})] +$$

$$\sum_{\ell'=1}^{L} [\Phi_{\ell\ell'}^{12}(r_{\ell i}) + \Phi_{\ell\ell'}^{22}(r_{\ell i})],$$

where $$\Phi_\ell^{free}(r_{\ell i}) := \sum_{j=1, j \neq i}^{N_\ell} \frac{Q_{\ell i}}{4\pi|r_{\ell i} - r_{\ell j}|}, \quad (3.15)$$

$$\Phi_{\ell\ell'}^{ab}(r_{\ell i}) := \sum_{j=1}^{N_{\ell'}} Q_{\ell' j} u_{\ell\ell'}^{ab}(r_{\ell i}, r_{\ell' j}).$$

The free space component $\Phi^{free}_l(r_{li})$ can be computed using traditional FMM techniques. Therefore, focus can be shifted to the computation of reaction components $\{\Phi_{ll'}^{ab}(r_{li})\ a, b = 1, 2$ in the l-th layer. In some cases, free space components only involve interactions between particles in the same layer. All interactions between particles in different layers are included in the reaction components. Two groups of particles involved in the computation of a reaction component could be physically far away from each other. However, the integral representation (3.12) for a general reaction component shows that the source and target coordinates may only be involved in the exponential kernels $e^{ik\alpha\cdot(\rho-\rho')}Z_{ll'}^{ab}(z,z')$ where the kernels $Z_{ll'}^{ab}(z,z')$ are determined not by the physical z-coordinates of r, r' but the local z-coordinates $z-d_l$, $d_{l-1}-z$ and $z'-d_{l'}$, $d_{l'-1}-z'$ with respect to corresponding interfaces. Based on this observation, equivalent polarization sources can be defined at coordinates $$r'_{11} := (x', y', d_\ell - (z' - d_{\ell'})), r'_{12} :=$$
$$(x', y', d_\ell - (d_{\ell'} - z')), r'_{21} := (x',$$
$$y', d_{\ell-1} + (z' - d_{\ell'})), r'_{22} := (x',$$
$$y', d_{\ell-1} - (d_{\ell'-1} - z')) \quad (3.16)$$

associated to the reaction components. Then any reaction component $u_{ll'}^{ab}(r, r')$ can be determined by the physical coordinates of the target and the associated equivalent polarization source. Two new exponential kernels can be defined as follows:

$$\varepsilon^+(r,r') := e^{ik\alpha\cdot(\rho-\rho')}e^{k_\rho(z-z')}, \varepsilon^-(r,r') := e^{ik\alpha\cdot(\rho-\rho')}$$
$$e^{-k_\rho(z-z')} \quad (3.17).$$

It can be verified that $$\varepsilon^+(r,r'_{1b})e^{ik\alpha\cdot(\rho-\rho')}Z_{\ell\ell'}^{1b}(z,z'), \varepsilon^-(r,r'_{2b})e^{ik\alpha\cdot(\rho-\rho')}$$
$$Z_{\ell\ell'}^{2b}(z,z'), b=1,2 \quad (3.18).$$

Therefore, the reaction components of layered Green's function can be re-expressed using the equivalent polarization coordinates as follows:

$$u_{\ell\ell'}^{1b}(r,r') = \tilde{u}_{\ell\ell'}^{1b}(r,r'_{1b}) := \frac{1}{8\pi^2}\int_0^\infty \int_0^{2\pi} \varepsilon^-(r,r'_{1b})\sigma_{\ell\ell'}^{1b}(k_\rho)d\alpha dk_\rho, \quad (3.19)$$

$$u_{\ell\ell'}^{2b}(r,r') = \tilde{u}_{\ell\ell'}^{2b}(r,r'_{2b}) := \frac{1}{8\pi^2}\int_0^\infty \int_0^{2\pi} \varepsilon^+(r,r'_{2b})\sigma_{\ell\ell'}^{2b}(k_\rho)d\alpha dk_\rho,$$

for b=1, 2. Substituting into the expression of $\Phi_{ll'}^{ab}(r_{li})$ in (3.15), the following is obtained $$\Phi_{\ell\ell'}^{ab}(r_{\ell i}) := \sum_{j=1}^{N_{\ell'}} Q_{\ell' j}\tilde{u}_{\ell\ell'}^{ab}(r_{\ell i}, r_{\ell' j}^{ab}), \quad (3.20)$$

where $$r_{\ell' j}^{11} = (x_{\ell' j}, y_{\ell' j}, d_\ell - (z_{\ell j} - d_{\ell'})), \quad (3.21)$$
$$r_{\ell' j}^{12} = (x_{\ell' j}, y_{\ell' j}, d_\ell - (d_{\ell'-1} - z_{\ell j})),$$
$$r_{\ell' j}^{21} = (x_{\ell' j}, y_{\ell' j}, d_{\ell-1} - (z_{\ell j} - d_{\ell'})),$$
$$r_{\ell' j}^{22} = (x_{\ell' j}, y_{\ell' j}, d_{\ell-1} - (d_{\ell'-1} - z_{\ell j})),$$

are coordinates of the associated equivalent polarization sources for the computation of reaction components in the l-th layer.

Figure 5:
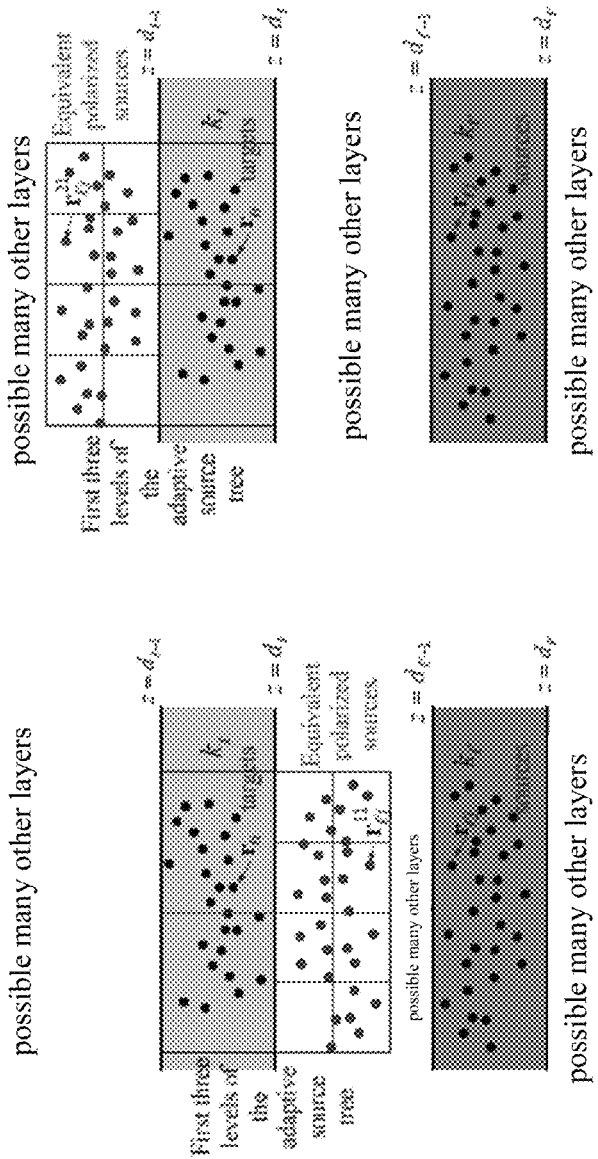
FIG. 5 illustrates equivalent polarized sources and boxes in a source tree.

FIGS. 4A-4D illustrate locations of equivalent polarization sources for the computation of reaction components. FIG. 5 illustrates equivalent polarized sources and boxes in a source tree.

Referring back to FIG. 1, the definition of equivalent polarized coordinates in (3.21) shows that the target particles $\{r_{li}\}_{i=1}^{N_l}$ and the corresponding equivalent polarized coordinates are, in some implementations, always located in different sides of interface $z=d_{l-1}$ or $z=d_l$. This property can imply significant advantages of using equivalent polarized coordinates and (3.20) in developing FMM for the reaction components $\Phi_{ll'}^{ab}(r_{li})$, a, b=1, 2.

To develop the FMM for reaction components $\Phi_{ll'}^{ab}(r_{li})$, the expression (3.20) with equivalent polarized coordinates is used. Therefore, the multipole local expansion and corresponding translation operators for $\tilde{u}_{ll'}^{ab}(r,r'_{ab})$ may be important. Separations $$\varepsilon^-(r,r'_{1b}) = \varepsilon^-_{\ell\ell'}(r,r_c^{1b})e^{ik\alpha\cdot(\rho_c^{1b}-\rho'_{1b})-k_\rho(z_c^{1b}-z'_{1b})} \varepsilon^+(r,r'_{2b}) =$$
$$\varepsilon^+_{\ell\ell'}(r,r_c^{2b})e^{ik\alpha\cdot(\rho_c^{2b}-\rho'_{2b})+k_\rho(z_c^{2b}-z'_{2b})} \quad (3.22)$$

and $$\varepsilon^-_{\ell\ell'}(r,r'_{1b}) = \varepsilon^{1b}_{\ell\ell'}(r_c^t,r'_{1b})e^{ik\alpha\cdot(\rho-\rho_c^t)-k_\rho(z-z_c^t)} \varepsilon^+_{\ell\ell'}(r,r'_{2b}) =$$
$$\varepsilon^{2b}_{\ell\ell'}(r_c^t,r'_{2b})e^{ik\alpha\cdot(\rho-\rho_c^t)+k_\rho(z-z_c^t)} \quad (3.23)$$

can be obtained for b=1, 2 by inserting the source center $r_c^s=(x_c^s,y_c^s,z_c^s)$ and the target center $r_c^t=(x_c^t,y_c^t,z_c^t)$ respectively. The notations $\varrho_c^s=(x_c^s,y_c^s)$, $\varrho_c^t=(x_c^t,y_c^t)$ can be used. Proposition 2.2, as described previously, gives the harmonic expansions $$e^{ik\alpha\cdot(\rho_c^{2b}-\rho'_{2b})+k_\rho(z_c^{2b}-z'_{2b})} = \quad (3.24)$$
$$\sum_{n=0}^\infty \sum_{m=-n}^n C_n^m (r_c^{2b})^n \overline{Y_n^m(\theta_c^{2b},\pi+\varphi_c^{2b})} k_\rho^n e^{im\alpha}, =$$
$$\sum_{n=0}^\infty \sum_{m=-n}^n C_n^m (r_c^{1b})^n \overline{Y_n^m(\pi-\theta_c^{1b},\pi+\varphi_c^{1b})} k_\rho^n e^{im\alpha}$$

and $$e^{ik\alpha\cdot(\mu-\rho_c^t)-k_\rho(z-z_c^t)} = \sum_{n=0}^\infty \sum_{m=-n}^n C_n^m r_t^n Y_n^m(\theta_t,\varphi_t) k_\rho^n e^{-im\alpha}, \quad (3.25)$$

$$e^{ik\alpha\cdot(\rho-\rho_c^t)+k_\rho(z-z_c^t)} = \sum_{n=0}^\infty \sum_{m=-n}^n C_n^m r_t^n Y_n^m(\pi-\theta_t,\varphi_t) k_\rho^n e^{-im\alpha},$$

where $(r_c^{ab},\theta_c^{ab},\phi_c^{ab})$ is the spherical coordinates of $(r'_{ab}-r_c^{ab})$ Because $Y_n^m(\pi-\theta,\phi)=(-1)^m Y_n^m(\theta,\phi)$, $Y_n^m(\theta,\pi+\phi)=(-1)^m Y_n^m(\theta,\phi)$, the spherical expansions together with source target separation (3.22) and (3.23) implies $$\varepsilon^-_{\ell\ell'}(r,r'_{1b}) = \quad (3.26)$$
$$\varepsilon^-_{\ell\ell'}(r,r_c^{1b})\sum_{n=0}^\infty \sum_{m=-n}^n (-1)^n C_n^m (r_c^{1b})^n \overline{Y_n^m(\theta_c^{1b},\varphi_c^{1b})} k_\rho^n e^{im\alpha},$$

$$\varepsilon^+_{\ell\ell'}(r,r'_{2b}) = \varepsilon^+_{\ell\ell'}(r,r_c^{2b})\sum_{n=0}^\infty \sum_{m=-n}^n (-1)^m C_n^m (r_c^{2b})^n \overline{Y_n^m(\theta_c^{2b},\varphi_c^{2b})} k_\rho^n e^{im\alpha}$$

and $$\varepsilon^-_{\ell\ell'}(r,r'_{1b}) = \varepsilon^-_{\ell\ell'}(r_c^t,r'_{1b})\sum_{n=0}^\infty \sum_{m=-n}^n C_n^m r_t^n Y_n^m(\theta_t,\varphi_t) k_\rho^n e^{-im\alpha} \quad (3.27)$$

$$\varepsilon^+_{\ell\ell'}(r,r'_{2b}) = \varepsilon_{\ell\ell'}(r_c^t,r'_{2b})\sum_{n=0}^\infty \sum_{m=-n}^n (-1)^{n+m} C_n^m r_t^n Y_n^m(\theta_t,\varphi_t) k_\rho^n e^{-im\alpha}$$

for b=1, 2. Then, a substitution of (3.26) and (3.27) into (3.19) gives multipole expansion $$\tilde{u}_{\ell\ell'}^{ab}(r,r'_{ab}) = \sum_{n=0}^\infty \sum_{m=-n}^n M_{nm}^{ab} \mathcal{F}_{nm}^{ab}(r,r_c^{ab}), \quad (3.28)$$

$$M_{nm}^{ab} = c_n^{-2}(r_c^{ab})^n \overline{Y_n^m(\theta_c^{ab},\varphi_c^{ab})}$$

at equivalent polarization source centers ($r_c^{ab}$) and local expansion $$\tilde{u}_{\ell\ell'}^{ab}(r, r'_{ab}) = \sum_{n=0}^{\infty} \sum_{m=-n}^{n} L_{nm}^{ab} r_t^n Y_n^m(\theta_t, \varphi_t) \quad (3.29)$$

at target center $r_c^t$, respectively. Components $\tilde{F}_{nm}^{ab}(r,r_c^{ab})$ are represented by Sommerfeld-type integrals $$\tilde{\mathcal{F}}_{nm}^{1b}(r, r_c^{1b}) = \frac{(-1)^n c_n^2 C_n^m}{8\pi^2} \int_0^\infty \int_0^{2\pi} \varepsilon^-(r, r_c^{1b})\sigma_{\ell\ell'}^{1b}(k_\rho)k_\rho^n e^{im\alpha} d\alpha dk_\rho, \quad (3.30)$$

$$\tilde{\mathcal{F}}_{nm}^{1b}(r, r_c^{2b}) = \frac{(-1)^m c_n^2 C_n^m}{8\pi^2} \int_0^\infty \int_0^{2\pi} \varepsilon^+(r, r_c^{2b})\sigma_{\ell\ell'}^{2b}(k_\rho)k_\rho^n e^{im\alpha} d\alpha dk_\rho,$$

and the local expansion coefficients are given by $$L_{nm}^{1b} = \frac{C_n^m}{8\pi^2} \int_0^\infty \int_0^{2\pi} \varepsilon^-(r_c^t, r'_{1b})\sigma_{\ell\ell'}^{1b}(k_\rho)k_\rho^n e^{-im\alpha} d\alpha dk_\rho, \quad (3.31)$$

$$L_{nm}^{2b} = \frac{(-1)^{n+m} C_n^m}{8\pi^2} \int_0^\infty \int_0^{2\pi} \varepsilon^+(r_c^t, r'_{2b})\sigma_{\ell\ell'}^{2b}(k_\rho)k_\rho^n e^{-im\alpha} d\alpha dk_\rho.$$

According to the definition of $E_{II}^-(r, r')$ $E_{II}^+(r, r')$, the centers ($r_c^t$ and $r_c^{ab}$) have to satisfy $z_c^{1b} < d_\ell$ $z_c^{2b} > d_{\ell-1}$, $z_c^t > d_\ell$ for $\tilde{u}_{\ell\ell'}^{1b}$ (r,r'$_{1b}$); $z_c^t < d_{\ell-1}$ for $\tilde{u}_{\ell\ell'}^{2b}$ (r,r'$_{2b}$) (3.32) to ensure the exponential decay in $E_{II}^-(r, r_c^{1b})$ $E_{II}^+(r,r_c^{2b})$) $E_{II}^-(r_c^t, r'_{1b})$ $E_{II}^+(r_c^t,r'_{2b})$ as $k_\rho \to \infty$ and hence the convergence of the corresponding Sommerfeld-type integrals in (3.30) and (3.31). These restrictions can be met in practice, since targets in the l-th layer and the equivalent polarized coordinates can be considered located either above the interface $z=d_{l-1}$ or below the interface $z=d_l$.

Then the center shifting and translation operators for ME (3.28) and LE (3.29) are derived. One advantageous features of the expansions of reaction components discussed previously is that (3.28) for the ME coefficients and (3.29) for the LE have similar form as the formulas of ME coefficients and LE for the free space Green's function. Therefore, the center shifting for multipole and local expansions can be the same as the free space case given in (2.21). Accordingly, in some implementations, only the translation operator from ME (3.28) to LE (3.29) needs to be derived. According to the definition of exponential functions in (3.17), $E^-(r,r_c^{1b})$, and $E^+(r,r_c^{2b})$ have the following splitting $\varepsilon^-(r,r_c^{1b})=\varepsilon^{-(r_c^t, r_c^{1b})}e^{ik_\alpha \cdot (\rho-\rho_c^t)}e^{-k_\rho(z-z_c^t)}$, $\varepsilon^+(r,r_c^{2b})=\varepsilon^+(r_c^t, r_c^{2b})e^{ik_\alpha \cdot (\rho-\rho_c^t)}e^{k_\rho(z-z_c^t)}$ Applying the spherical harmonic expansion (2.29), the following can be obtained $e^{ik_\alpha \cdot (\rho-\rho_c^t)}e^{\pm k_\rho(z-z_c^t)} = \sum_{n=0}^{\infty}\sum_{m=-n}^{n}$ $(?1)^{n+m}C_n^m r_t^n Y_n^m(\theta_t,\varphi_t)k_\rho^n e^{-im\alpha}$. Substituting into (3.28), the multipole expansion is translated to local expansion (3.29) via $$L_{nm}^{1b} = \sum_{n'=0}^{\infty}\sum_{|m'|=0}^{n'} T_{nm,n'm'}^{1b} M_{n'm'}^{1b}, \quad (3.33)$$

$$L_{nm}^{2b} = (-1)^{n+m}\sum_{n'=0}^{\infty}\sum_{|m'|=0}^{n'} T_{nm,n'm'}^{2b} M_{n'm'}^{2b}$$

and the M2L translation operators are given in integral forms as follows $$T_{nm,n'm'}^{1b} = \quad (3.34)$$

$$\frac{(-1)^{n'} D_{nm}^{n'm'}}{8\pi^2} \int_0^\infty \int_0^{2\pi} \varepsilon^-(r_c^t, r_c^{1b})\sigma_{\ell\ell'}^{1b}(k_\rho)k_\rho^{n+n'} e^{i(m'-m)\alpha} d\alpha dk_\rho$$

$$T_{nm,n'm'}^{2b} = \frac{(-1)^{n+m+m'} D_{nm}^{n'm'}}{8\pi^2}$$

$$\int_0^\infty \int_0^{2\pi} \varepsilon^+(r_c^t, r_c^{2b})\sigma_{\ell\ell'}^{2b}(k_\rho)k_\rho^{n+n'} e^{i(m'-m)\alpha} d\alpha dk_\rho,$$

where $D_{nm}^{n'm'} = c_n^2$, $C_n^m C_{n'}^{m'}$. The Sommerfeld-type integrals in (3.34) is ensured by the conditions in (3.32).

The interaction determination module 113 is configured to determine, using an FMM, interactions of charge sources based on the charge sources, the polarization charge sources, the ME operators, and the M2L translation operators. For example, the framework of the traditional FMM together with ME (3.28), LE (3.29), M2L translation (3.33)-(3.34) and free space ME and LE center shifting (2.21) and (2.22) can constitute the FMM for the computation of reaction components ($\Phi_{II'}^{ab}(r_{li})$ a, b=1, 2). In the FMM for each reaction component, a large box can be defined to include all equivalent polarized coordinates and corresponding target particles where the adaptive tree structure will be built by a bisection procedure (see right side of FIG. 5). The validity of the ME (3.28), LE (3.29) and M2L translation (3.33) used in the algorithm can impose restrictions (3.32) on the centers, accordingly. This can be ensured by setting the largest box for the specific reaction component to be equally divided by the interface between equivalent polarized coordinates and targets (see right side of FIG. 5). Thus, the largest box for the FMM implementation can be different for different reaction component. With this setting, all source and target boxes of level higher than zeroth level in the adaptive tree structure will have centers below or above the interfaces, accordingly.

The fast multipole algorithm for the computation of a general reaction component $\Phi_{II'}^{ab}(r_{li})$ can be summarized in Algorithm 1, described later. All the interactions given by (3.14) can be obtained by calculating all components and then summing them together (as presented in Algorithm 2, described later). In some cases, the FMM demands efficient computation of the double integrals involved in the ME, LE and M2L translations. For these purposes a recurrence formula for efficient computation of the Sommerfeld type integrals can be used. Firstly, the double integrals can be simplified by using the following identity $$J_n(z) = \frac{1}{2\pi i^n} \int_0^{2\pi} e^{iz\cos\theta + in\theta} d\theta. \quad (3.35)$$

In particular, multipole expansion functions in (3.30) can be simplified as:

$$\tilde{F}_{nm}^{1b}(r, r_c^{1b}) = \frac{(-1)^n c_n^2 C_n^m \bar{i}^n e^{im\phi_s^{1b}}}{4\pi} \int_0^\infty J_m(k_\rho \rho_s^{1b}) e^{-k_\rho(z-z_c^{1b})} \sigma_{\ell\ell'}^{1b}(k_\rho) k_\rho^n dk_\rho$$

$$\tilde{F}_{nm}^{2b}(r, r_c^{2b}) = \frac{(-1)^m c_n^2 C_n^m \bar{i}^n e^{im\phi_s^{2b}}}{4\pi} \int_0^\infty J_m(k_\rho \rho_s^{2b}) e^{-k_\rho(z_c^{2b}-z)} \sigma_{\ell\ell'}^{2b}(k_\rho) k_\rho^n dk_\rho$$

for b=1,2 and the expression (3.31) for local expansion coefficients can be simplified as $$L_{nm}^{1b} = \frac{C_n^m \bar{i}^{-m} e^{-im\varphi_t^{1b}}}{4\pi} \int_0^\infty J_{-m}(k_\rho \rho_t^{1b}) e^{-k_\rho(z_c^t - z_{1b}')} \sigma_{\ell\ell'}^{1b}(k_\rho) k_\rho^n dk_\rho$$

$$L_{nm}^{2b} = \frac{(-1)^{n+m} C_n^m \bar{i}^{-m} e^{-im\varphi_t^{2b}}}{4\pi} \int_0^\infty J_{-m}(k_\rho \rho_t^{2b}) e^{-k_\rho(z_{2b}'-z_c^t)} \sigma_{\ell\ell'}^{2b}(k_\rho) k_\rho^n dk_\rho$$

where $(\rho_s^{ab}, \varphi_s^{ab})$ and $(\rho_t^{ab}, \varphi_t^{ab})$ are polar coordinates of $(r-r_c^{ab})$ and $(r_c^t-r_{ab}')$ (projected in the xy plane). Moreover, the M2L translation (3.34) can be simplified as $$T_{nm,n'm'}^{1b} = \qquad (3.36)$$

$$\frac{(-1)^{n'} \tilde{D}_{nm}^{n'm'}(\varphi_{ts}^{1b})}{4\pi} \int_0^\infty k_\rho^{n+n'} J_{m'-m}(k_\rho \rho_{ts}^{1b}) e^{-k_\rho(z_c^t - z_c^{1b})} \sigma_{\ell\ell'}^{1b}(k_\rho) dk_\rho$$

$$T_{nm,n'm'}^{2b} = \frac{(-1)^{n+m+m'} \tilde{D}_{nm}^{n'm'}(\varphi_{ts}^{2b})}{4\pi}$$

$$\int_0^\infty k_\rho^{n+n'} J_{m'-m}(k_\rho \rho_{ts}^{2b}) e^{-k_\rho(z_c^{2b}-z_c^t)} \sigma_{\ell\ell'}^{2b}(k_\rho) dk_\rho,$$

where $(\rho_{ts}^{ab}, \varphi_{ts}^{ab})$ is the polar coordinates of $(r_c^t-r_c^s)$ projected in xy plane, $D_{nm}^{n'm'}(\varphi) = D_{nm}^{n'm'} i^{m'-m} e^{i(m'-m)\varphi}$.

The following integral can be defined $$I_{\nu\mu}^{ab}(\rho, z) := \int_0^\infty J_\mu(k_\rho \rho) \frac{k_\rho^\nu e^{-k_\rho z}}{\sqrt{(\nu+\mu)!(\nu-\mu)!}} \sigma_{\ell\ell'}^{ab}(k_\rho) dk_\rho, \qquad (3.37)$$

then $$\tilde{F}_{nm}^{1b}(r, r_c^{1b}) = \frac{c_n e^{im\varphi_s^{1b}}}{4\pi} I_{nm}^{1b}(\rho_s^{1b}, z - z_c^{1b}),$$

$$\tilde{F}_{nm}^{2b}(r, r_c^{2b}) = \frac{(-1)^{n+m} c_n e^{im\varphi_s^{2b}}}{4\pi} I_{nm}^{2b}(\rho_s^{2b}, z_c^{2b} - z),$$

$$L_{nm}^{1b} = \frac{(-1)^n c_n^{-1} e^{-im\varphi_t^{1b}}}{4\pi} I_{nm}^{1b}(\rho_t^{1b}, z_c^t - z_{1b}'),$$

$$L_{nm}^{2b} = \frac{(-1)^m c_n^{-1} e^{-im\varphi_t^{2b}}}{4\pi} I_{nm}^{2b}(\rho_t^{2b}, z_{2b}' - z_c^t),$$

$$T_{nm,n'm'}^{1b} = \frac{(-1)^{n+m} Q_{nm}^{n'm'} e^{i(m'-m)\varphi_{ts}^{1b}}}{4\pi} I_{n+n',m'-m}^{1b}(\rho_{ts}^{1b}, z_c^t - z_c^{1b}),$$

$$T_{nm,n'm'}^{2b} = \frac{(-1)^{n'+m'} Q_{nm}^{n'm'} e^{i(m'-m)\varphi_{ts}^{2b}}}{4\pi} I_{n+n',m'-m}^{1b}(\rho_{ts}^{2b}, z_c^{2b} - z_c^t), \qquad (3.38)$$

where $$Q_{nm}^{n'm'} := \sqrt{\frac{(2n'+1)(n+n'+m'-m)!(n+n'-m'+m)!}{(2n+1)(n+m)!(n-m)!(n'+m')!(n'-m')!}}.$$

Therefore, in some implementations, only efficient computation of Sommerfeld-type integrals $I_{\mu\nu}^{ab}$ defined in (3.37) is needed. Such integrals can have oscillatory integrands. These integrals are convergent when the target and source particles are not exactly on the interfaces of a layered medium. High order quadrature rules can be used for direct numerical computation at runtime. However, this may become expensive due to a large number of integrals that may be needed in the FMM. For example, $(p+1)(2p+1)$ integrals may be required for each source box to target box translation. Moreover, the involved integrand decays more slowly as $(\nu)$ increases. An important aspect of the implementation of FMM can concern scaling. Since $M_{nm}^{ab} \approx (|r-r_c^{ab}|)^n$, $L_{nm}^{ab} \approx (|r^{ab}-r_c^t|)^{-n}$, some uses of the expansions (3.28) and (3.29) in the described implementations of FMM may encounter underflow and overflow issues. To avoid this, one expansions can be scaled, replacing $M_{nm}^{ab}$ with $M_{nm}^{ab}/S^n$ and $L_{nm}^{ab}$ with $L_{nm}^{ab} S^n$. To compensate for this scaling, $\tilde{F}_{nm}^{ab}(r,r_c^{ab})$ can be replaced with $\tilde{F}_{nm}^{ab}(r,r_c^{ab})S^n$, $T_{nm,n'm'}^{ab}$ with $T_{nm,n'm'}^{ab} S^{n+m}$. The scaling factor (S) can be chosen to be the size of the box in which the computation occurs. Therefore, the following scaled Sommerfeld-type integrals $$S^\nu I_{\nu\mu}^{ab}(\rho, z) = \int_0^\infty J_\mu(k_\rho \rho) \frac{(k_\rho S)^\nu e^{-k_\rho z} \sigma_{\ell\ell'}^{ab}(k_\rho)}{\sqrt{(\nu+\mu)!(\nu-\mu)!}} dk_\rho, \qquad (3.39)$$

$$\nu \geq 0, \mu = 0, 1, \ldots, \nu$$

can be involved in the described implementation of FMM. According to the recurrence formula $$J_{\mu+1}(z) = \frac{2\mu}{z} J_\mu(z) - J_{\mu-1}(z),$$

the following can be obtained $$S^\nu I_{\nu\mu+1}^{ab}(\rho, z) = \int_0^\infty J_{\mu+1}(k_\rho \rho) \frac{(k_\rho S)^\nu e^{-k_\rho z} \sigma_{\ell\ell'}^{ab}(k_\rho)}{\sqrt{(\nu+\mu+1)!(\nu-\mu-1)!}} dk_\rho =$$

$$\frac{2\mu s}{\rho} \int_0^\infty J_\mu(k_\rho \rho) \frac{(k_\rho S)^{\nu-1} e^{-k_\rho z} \sigma_{\ell\ell'}^{ab}(k_\rho)}{\sqrt{(\nu+\mu-1)!(\nu-\mu-1)!}} \sqrt{\frac{(\nu+\mu-1)!}{(\nu+\mu+1)!}} dk_\rho -$$

$$\int_0^\infty J_{\mu-1}(k_\rho \rho) \frac{(k_\rho S)^\nu e^{-k_\rho z} \sigma_{\ell\ell'}^{ab}(k_\rho)}{\sqrt{(\nu+\mu-1)!(\nu-\mu+1)!}} \sqrt{\frac{(\nu+\mu-1)!(\nu-\mu+1)!}{(\nu+\mu+1)!(\nu-\mu-1)!}} dk_\rho.$$

Denoted by $a_n = \sqrt{n(n+1)}$, the following recurrent formula can be obtained $$S^\nu I_{\nu\mu+1}^{ab}(\rho, z) = \frac{2\mu}{a_{\nu+\mu}} \frac{S}{\rho} S^{\nu-1} I_{\nu-1\mu}^{ab}(\rho, z) - \frac{a_{\nu-\mu}}{a_{\nu+\mu}} S^\nu I_{\nu\mu-1}^{ab}(\rho, z), \qquad (3.40)$$

$$\mu \geq 1, \nu \geq \mu+1.$$

This recurrence formula can be considered stable when $$\frac{2\mu}{\sqrt{(\nu+\mu+1)(\nu+\mu)}} < \frac{\rho}{S}. \qquad (3.41)$$

For (v>u+1, u>1), the following can be obtained $$\frac{2\mu}{\sqrt{(v+\mu+1)(v+\mu)}} < \frac{1}{\sqrt{3}}.$$

In $\tilde{F}_{nm}^{ab}(r, r_c^{ab})S^n)$ and $(L_{nm}^{ab}S^n))$, $\varrho_s^{ab}$, $\varrho_t^{ab}$, could be arbitrary small. Therefore, the recurrence formula (3.40) may not be able to be applied to calculate them. Fortunately, it may be unnecessary to calculate $\tilde{F}_{nm}^{ab}(r,r_c^{ab})S^n)$ and $L_{nm}^{ab}S^n$ in the FMM. The coefficients $L_{nm}^{sb}S^n$ can be calculated by multipole-to-local translations and then the interactions can be obtained via local expansions (3.29). Therefore, in some implementations, only the computation of the integrals involved in the multipole-to-local translation matrices $(T_{nm,n'm'}^{ab})$ are considered. For any target box in the interaction list of a given polarization source box, it can be found that $z_{ts}^{ab}$ is either 0 or larger than $\sqrt{2}S$. If $\varrho_{ts}^{ab}=0$, the following can be obtained $$I_{\nu\mu}^{ab}(\rho_{ts}^{ab}, \varrho\,)=0, \forall\mu>0, \forall\varrho >0 \qquad (3.42).$$

In come cases, $\varrho_{ts}^{ab}>\sqrt{2}S$ and the recurrence formula (3.40) can be applied. For example, given truncation number p, the initial values $\{I_{\nu0}^{ab}(\varrho\,,z)\}_{\nu=0}^{2p}$ and $\{I_{\nu1}^{ab}(\varrho\,,z)\}_{\nu=1}^{2p}$ can be computed by using composite Gaussian quadrature along the positive real line. The unbounded interval [0;1) can be truncated at a point ($X_{max}>0$), where the integrand has decayed to a user specified tolerance (e.g., $10^{-14}$). In order to efficiently compute the direct interactions between particles in neighboring boxes, pre-computed tables for $I_{00}^{ab}(\varrho\,,z)$ can be used. Since, in some cases, only interactions between particles in neighboring leaf boxes are required for direct calculation, the pre-computed table for $I_{\nu0}^{ab}(\varrho\,,z)$ in a small domain ($[0, 3S_{min}]\times[2d_{min}, 3S_{min}]$) may be needed, where $S_{min}$ is the size of the leaf boxes in the tree structure, dmin is the minimum distance between particles and corresponding interface. $I_{\nu0}^{ab}(\varrho\,,z)$ can be a smooth function in the domain of interest. It is feasible to make a precomputed table on a fine grid and then use interpolation to obtain approximations for the integrals. The integral $I_{\nu0}^{ab}(\varrho\,,z)$ can be pre-computed on a 2-D grid $\{\varrho_i, z_j\}$ in the domain $[0, 3S_{min}]\times[2d_{min}, 3S_{min}]$. Then, a polynomial interpolation can be performed for the direct calculation in the FMM. In some implementations, the technique of using pre-computed tables together with polynomial interpolation can also be applied for efficient computation of the initial values $\{I_{\nu0}^{ab}(\varrho\,,z)\}_{\nu=0}^{2p}$ and $\{I_{\nu1}^{ab}(\varrho\,,z)\}_{\nu=1}^{2p}$ at run time. Then 4p+1 tables can be be pre-computed on the 2-D grid in a domain of interest.

As previously indicated, one example algorithm ("Algorithm 1") that can be used for performing the FMM for the general reaction component in accordance with implementations of the present disclosure is as follows:

```
Determine equivalent polarized coordinates for all source particles.
Generate an adaptive hierarchical tree structure with polarization
sources
{Q_tj, r_tj^ab}_{j=1}^{N_tl},
targets {r_ti}_{i=1}^{N_l} and pre-compute the table of I_00^ab (p, Z) defined in
(3.37).
Upward pass:
for l = H → 0 do
    for all boxes j on source tree level l do
        if j is a leaf node then
            form the free-space ME using Eq. (3.28).
        else
            form the free-space ME by merging children's expansions
using the free-space center shift translation operator (2.21).
        end if
    end for
end for
Downward pass:
for l = 1 → H do
    for all boxes j on target tree level l do
        shift the LE of j's parent to j itself using the free-space shifting
(2.22).

collect interaction list contribution using the source box to
    target box translation operator in Eq. (3.33) while
    T_{nm,n'm'}^{ab}, are computed using (3.38) and recurrence
    formula (3.40).

end for
end for
Evaluate Local Expansions:
for each leaf node (childless box) do
    evaluate the local expansion at each particle location.
end for
Local Direct Interactions:
for i = 1 → N do compute Eq. (3.20) of target particle i in the neighboring
    boxes using the pre-computed table of I_00^ab(ρ, ϱ ). end
    for.
```

An example 3D FMM algorithm for (3.14) is as follows:

```
for ℓ = 0 → L do
    use free space FMM to compute Φ_ℓ^{free}(r_ℓi), i = 1, 2, ... , N_ℓ.
end for
for ℓ = 0 → L - 1 do
    for ℓ ' = 0 → L - 1 do
        use Algorithm 1 to compute Φ_{ℓℓ'}^{11}(r_ℓi), i = 1, 2, ... , N_ℓ.
    end for
    for ℓ ' = 1 → L do
        use Algorithm 1 to computer Φ_{ℓℓ'}^{12}(r_ℓi), i = 1, 2, ... , N_ℓ.
    end for
end for
for ℓ = 1 → L do
    for ℓ ' = 0 → L - 1 do
        use Algorithm 1 to computer Φ_{ℓℓ'}^{21}(r_ℓi), i = 1, 2, ... , N_ℓ.
    end for
    for ℓ ' = 1 → L do
        use Algorithm 1 to computer Φ_{ℓℓ'}^{22}(r_ℓi), i = 1, 2, ... , N_ℓ.
    end for
end for
```

Figure 2:
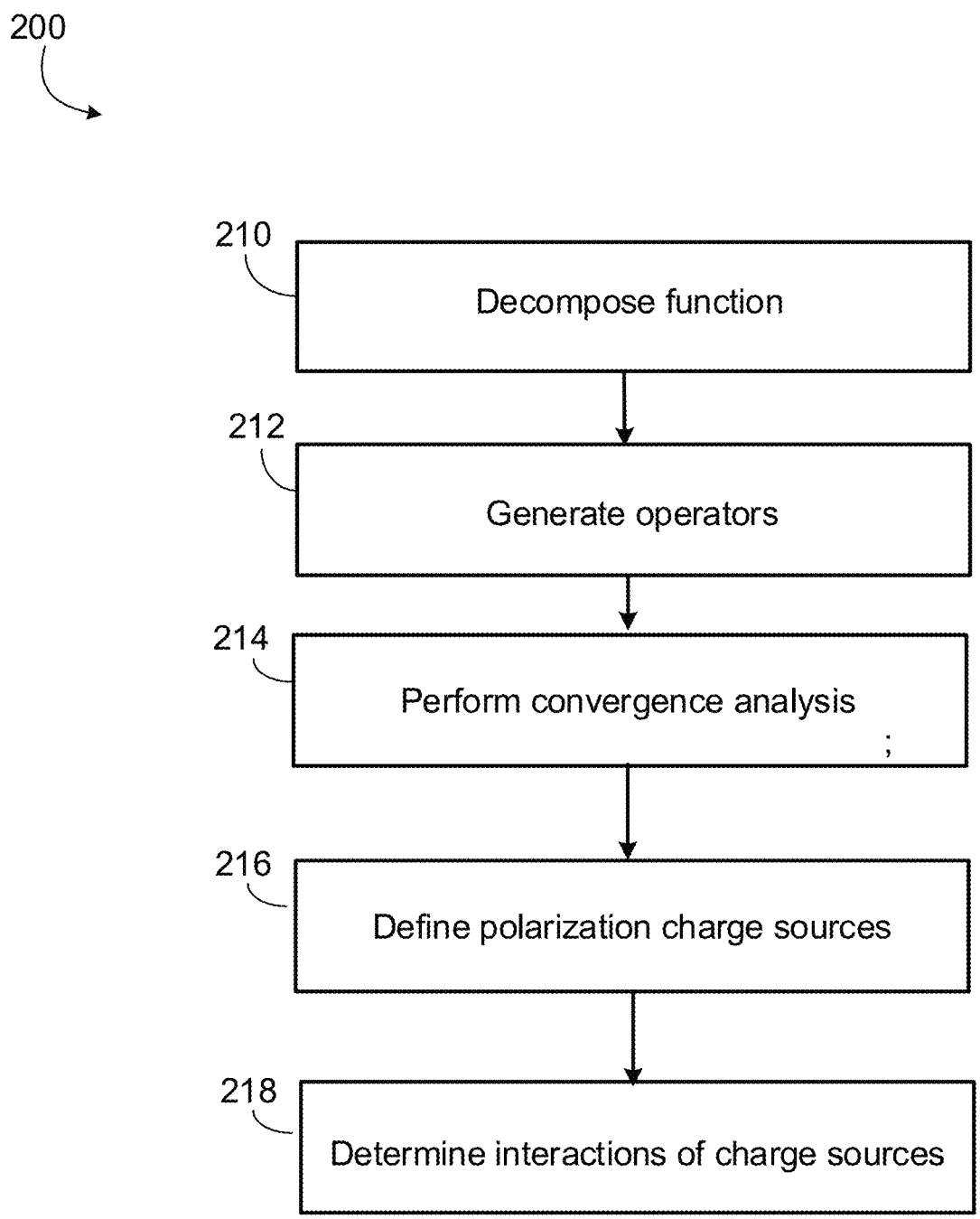
FIG. 2 is flowchart illustrating an example method for computing interactions of sources embedded in 3D layered media.

FIG. 2 illustrating an example method for computing interactions of sources embedded in 3D layered media. In some implementations, the system 100 discussed previously with reference to FIG. 1 performs all or portions of the method 200. The method 200 includes decomposing a function representing the potential caused by charge sources embedded in 3D layered media into a free space component and a plurality of reaction components (block 210), generating a ME expansion operator and M2L translation operator for each reaction component of the plurality of reaction components (block 212), performing a convergence analysis of an ME for each of the plurality of reaction components (block 214), defining polarization charge sources for each reaction component based on the convergence analysis, and combining the polarization charge sources with the charge sources (block 216), and determining interaction of the charge sources based on the polarization charge sources, ME operators, and M2L translation operators (block 218).

Figure 6:
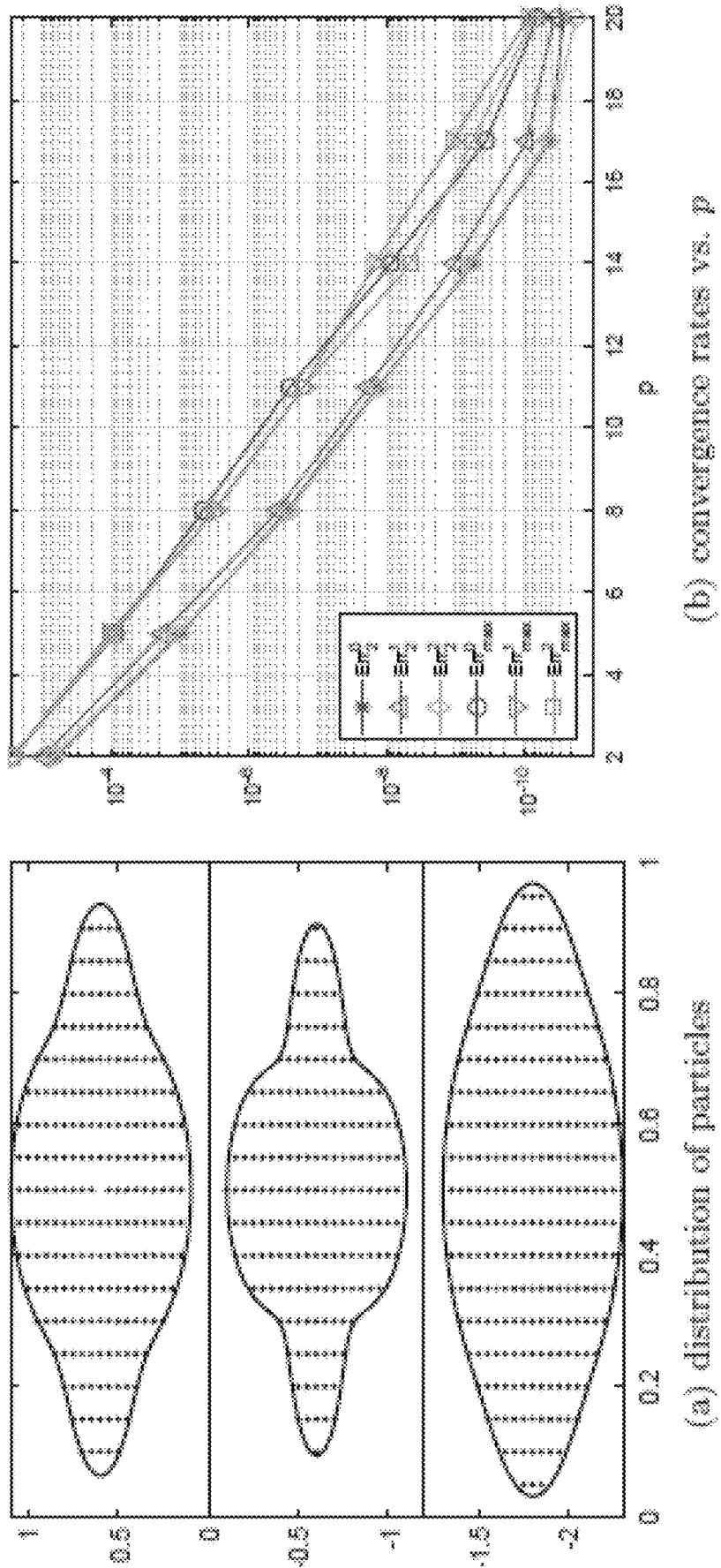
FIGS. 6-8 show example experimental results using the techniques described in this specification
Figure 7:
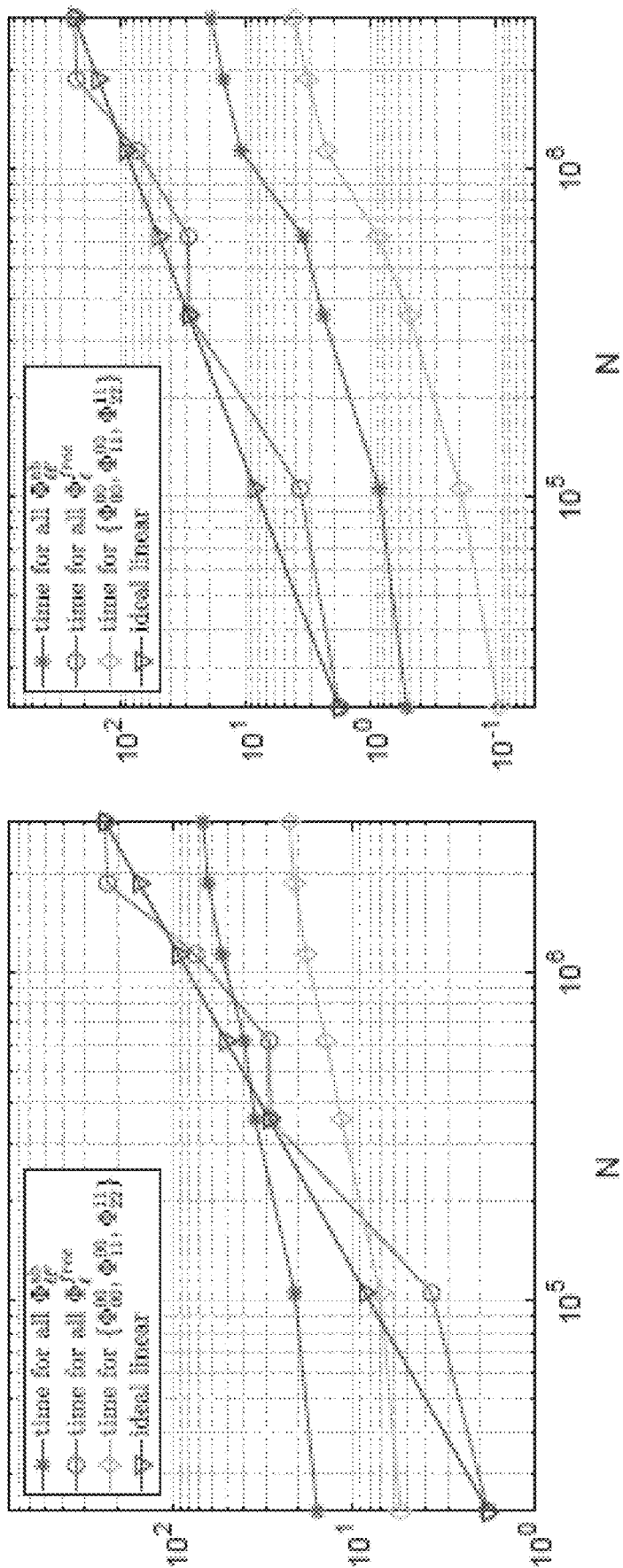
Figure 8:
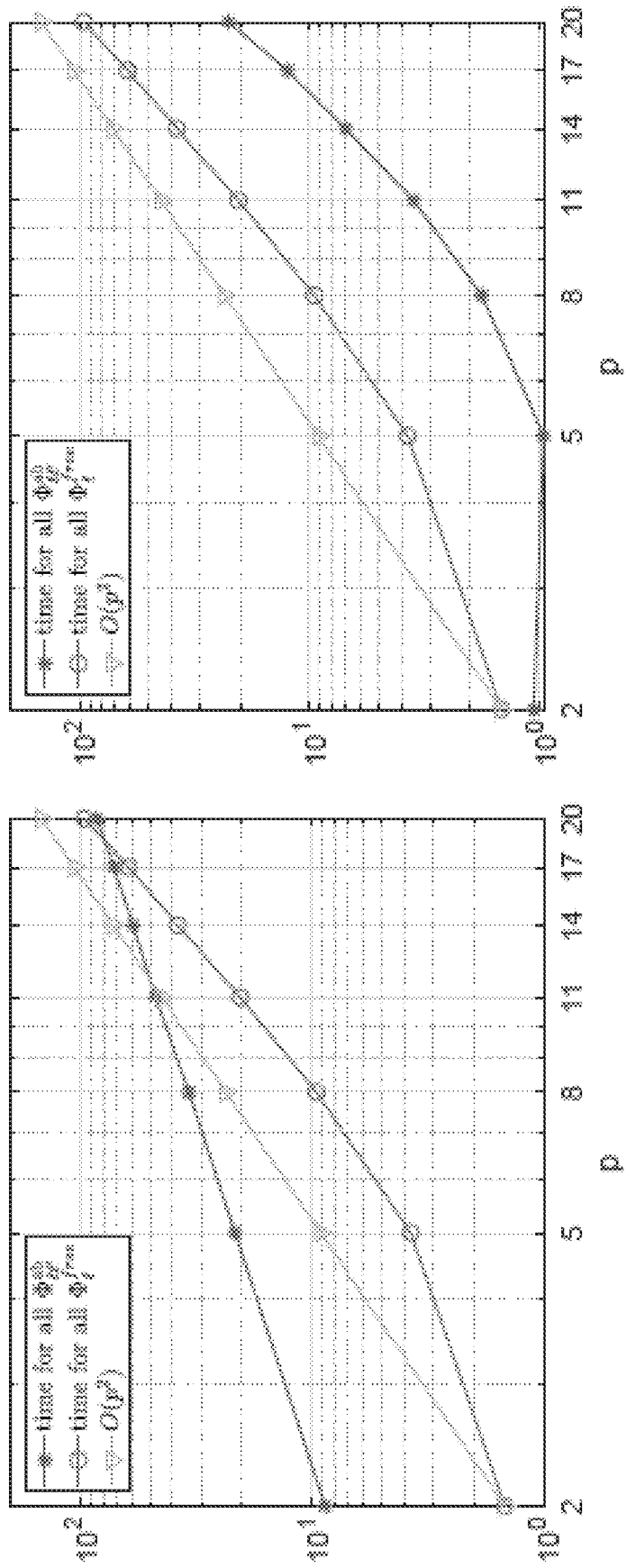

FIGS. 6-8 show example experimental results using the techniques described in this specification. The systems and methods described previously were implemented based on an open-source FMM package on a workstation with two Xeon E5-2699 v4 2.2 GHz processors (each having 22 cores) and 500 GB RAM. The problem was tested in three layers media with interfaces placed at z0=0, z1=−1:2. Particles were set to be uniformly distributed in irregular domains which were obtained by shifting the domain determined by r=0.5−a+a (35 cos 4 θ−30 cos 2 θ+3) with a=0.1, 0.15, 0.05 to new centers (0, 0, 0.6), (0, 0, −0.6) and (0, 0, −1.8), respectively (see FIG. 6 for the cross section of the domains). All particles were generated by keeping the uniform distributed particles in a larger cube within corresponding irregular domains. In the layered media, the material parameters were set to be $k_0=21.2$, $k_1=47.5$, $k_2=62.8$. $\tilde{\Phi}_\ell(r_{\ell i})$ were defined as the approximated values of $\Phi_\ell(r_{\ell i})$ calculated by FMM. $1^2$ and maximum errors were defined as $$Err_2^\ell := \sqrt{\frac{\sum_{i=1}^{N_\ell} |\Phi_\ell(r_{\ell i}) - \tilde{\Phi}_\ell(r_{\ell i})|^2}{\sum_{i=1}^{N_\ell} |\Phi_\ell(r_{\ell i})|^2}}, \quad (4.1)$$

$$Err_{max}^\ell := \max_{1 \leq i \leq N_\ell} \frac{|\Phi_\ell(r_{\ell i}) - \tilde{\Phi}_\ell(r_{\ell i})|}{|\Phi_\ell(r_{\ell i})|}.$$

For accuracy test, N=912+640+1296 particles were placed in the irregular domains in three layers (see FIG. 6). Convergence rates against p can be seen in FIG. 6. The CPU time for the computation of all three free space components $\Phi_l^{free}(r_{li})$, and all sixteen reaction components $\Phi_{ll'}^{ab}(r_{li})$ with fixed truncation umber p=5 are compared in FIG. 7 for up to 3 millions particles. It was demonstrated that all of the components have an O(N) complexity while the CPU time for the computation of reaction components has a much smaller linear scaling constant due to the fact that most of the equivalent polarization sources are well-separated with the targets. Moreover, the CPU time for the computation of all three free space components $\Phi_l^{free}(r_{li})$ and all sixteen reaction components $\Phi_{ll'}^{ab}(r_{li})$ with fixed number of particles N=34178+23851+47919 are compared in FIG. 8 for truncation number p from 2 to 20. CPU time with multiple cores is given in Table 1 below, which shows that, due to the small amount of CPU time in computing the reaction components, the speedup of the parallel computing is mainly decided by the computation of the free space components. Only parallel implementation within the computation of each component was used. The computation of each component was independent of other components. Therefore, it can be straightforward to implement a version of the algorithm which computes all components in parallel.

Figure 9:
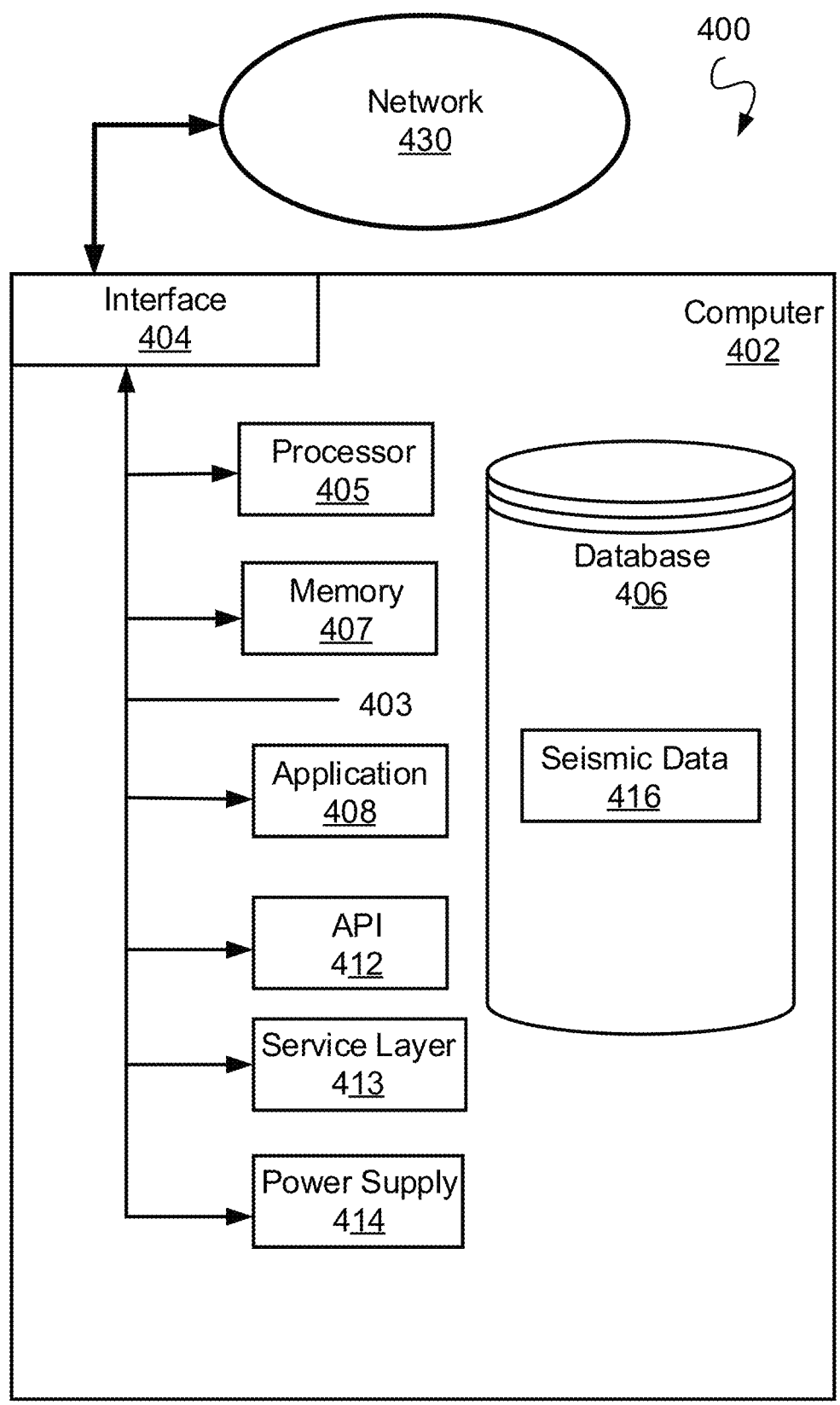
FIG. 9 is a block diagram illustrating an example computer system used to provide computational functionalities associated with described algorithms, methods, functions, processes, flows, and procedures as described in the present disclosure, according to some implementations of the present disclosure.

FIG. 9 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 9, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the hardware of the interface can be operable to communicate physical signals within and outside of the illustrated computer 402.

The computer 402 includes a processor 405. Although illustrated as a single processor 405 in FIG. 9, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data (for example, seismic data 416) for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 9, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 9, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of these systems and methods have been described. Nevertheless, it will be understood that various modifications may be made without departing from the spirit and scope of this disclosure. Accordingly, other implementations are within the scope of the following claims.

What is claimed is:

1. A method for computing interactions of charge sources embedded in three dimensional (3D) layered media, comprising:
    decomposing the Green's function representing the potential caused by a charge source into a free space component and a plurality of reaction components;
    generating, for each reaction component of the plurality of reaction components, a multipole expansion (ME) operator and a multipole to local (M2L) translation operator;
    performing, for each reaction component of the plurality of reaction components, a convergence analysis of the ME operator of that reaction component;
    defining, for each reaction component, polarization charge sources based on the convergence analysis and combining the polarization charges sources with the charge sources; and
    computing, using a fast multipole method (FMM), interactions of the charge sources based on the polarization charge sources, the ME operator, and the M2L translation operator.

2. The method of claim 1, wherein generating the ME operator and the M2L operator comprises using a Sommerfeld-type integral representation of a Green's function.

3. The method of claim 1, wherein the function comprises a Laplace Green's function.

4. The method of claim 1, wherein the convergence analysis is based at least partially on a location of a charge source and a location of a polarization charge source.

5. The method of claim 1, wherein connection between the polarization charge sources and the charge sources is achieved in a convergence behavior of the ME operator.

6. The method of claim 1, wherein determining interactions comprises using a recurrence formula.

7. A system for computing interactions of charge sources embedded in three dimensional (3D) layered media,, comprising:
    a computer-readable memory comprising computer-executable instructions; and
    at least one processor configured to execute the computer-executable instructions, wherein when the at least one processor is executing the computer-executable instructions, the at least one processor is configured to carry out operations comprising:
        decomposing the Green's function representing the potential caused by a charge source into a free space component and a plurality of reaction components;
        generating, for each reaction component of the plurality of reaction components, a multipole expansion (ME) operator and a multipole to local (M2L) translation operator;

performing, for each reaction component of the plurality of reaction components, a convergence analysis of the ME operator of that reaction component;

defining, for each reaction component, polarization charge sources based on the convergence analysis and combining the polarization charges sources with the charge sources; and computing, using a fast multipole method (FMM), interactions of the charge sources based on the polarization charge sources, the ME operator, and the M2L translation operator.

8. The system of claim 7, wherein generating an ME operator and an M2L operator comprises using a Sommerfeld-type integral representation of a Green's function.

9. The system of claim 7, wherein the function comprises a Laplace Green's function.

10. The system of claim 7, wherein the convergence analysis is based at least partially on a location of a charge source and a location of a polarization charge source.

11. The system of claim 7, wherein connection between the polarization charge sources and the charge sources is achieved in a convergence behavior of the ME.

12. The system of claim 7, wherein determining interactions comprises using a recurrence formula.

13. A non-transitory computer storage medium encoded with computer program instructions that when executed by one or more computers cause the one or more computers to perform operations comprising:

decomposing the Green's function representing the potential caused by a charge source into a free space component and a plurality of reaction components;

generating, for each reaction component of the plurality of reaction components, a multipole expansion (ME) operator and a multipole to local (M2L) translation operator;

performing, for each reaction component of the plurality of reaction components, a convergence analysis of the ME of that reaction component;

defining, for each reaction component, polarization charge sources based on the convergence analysis and combining the polarization charges sources with the charge sources; and computing, using a fast multipole method (FMM), interactions of the charge sources based on the polarization charge sources, the ME operator operators, and the M2L translation operator.

14. The non-transitory computer storage medium of claim 13, wherein generating an ME operator and an M2L operator comprises using a Sommerfeld-type integral representation of a Green's function.

15. The non-transitory computer storage medium of claim 13, wherein the function comprises a Laplace Green's function.

16. The non-transitory computer storage medium of claim 13, wherein the convergence analysis is based at least partially on a location of a charge source and a location of a polarization charge source.

17. The non-transitory computer storage medium of claim 13, wherein connection between the polarization charge sources and the charge sources is achieved in a convergence behavior of the ME.

18. The non-transitory computer storage medium of claim 13, wherein determining interactions comprises using a recurrence formula.

* * * * *

UNITED STATES PATENT AND TRADEMARK OFFICE
CERTIFICATE OF CORRECTION

PATENT NO. : 12,073,149 B2
APPLICATION NO. : 17/341596
DATED : August 27, 2024
INVENTOR(S) : Wei Cai, Bo Wang and Wenzhong Zhang It is certified that error appears in the above-identified patent and that said Letters Patent is hereby corrected as shown below:

In the Claims

In Column 30, Line 52, Claim 7, please replace "media,," with -- media, --

In Column 32, Line 13, Claim 13, please replace "operator operators," with -- operator, --

Signed and Sealed this
Fifteenth Day of October, 2024

Katherine Kelly Vidal
*Director of the United States Patent and Trademark Office*